United States Patent
Okuda et al.

(10) Patent No.: US 9,982,153 B2
(45) Date of Patent: May 29, 2018

(54) INK SET AND RECORDING METHOD USING THE SAME

(71) Applicant: Seiko Epson Corporation, Tokyo (JP)

(72) Inventors: Ippei Okuda, Shiojiri (JP); Tetsuya Aoyama, Shiojiri (JP)

(73) Assignee: Seiko Epson Corporation (JP)

( * ) Notice: Subject to any disclaimer, the term of this patent is extended or adjusted under 35 U.S.C. 154(b) by 194 days.

(21) Appl. No.: 14/327,724

(22) Filed: Jul. 10, 2014

(65) Prior Publication Data
US 2015/0054883 A1 Feb. 26, 2015

(30) Foreign Application Priority Data

Aug. 21, 2013 (JP) ................. 2013-171444
Sep. 3, 2013 (JP) ................. 2013-182504
May 28, 2014 (JP) ................. 2014-109749

(51) Int. Cl.
| | | |
|---|---|---|
| G01D 11/00 | (2006.01) | |
| C09D 11/40 | (2014.01) | |
| C09D 11/322 | (2014.01) | |
| C09D 11/54 | (2014.01) | |

(52) U.S. Cl.
CPC ............ C09D 11/40 (2013.01); C09D 11/322 (2013.01); C09D 11/54 (2013.01)

(58) Field of Classification Search
None
See application file for complete search history.

(56) References Cited

U.S. PATENT DOCUMENTS

| | | |
|---|---|---|
| 6,426,375 B1 | 7/2002 | Kubota |
| 2002/0192381 A1 | 12/2002 | Nitzan et al. |
| 2003/0008938 A1* | 1/2003 | Sano ............. C09D 11/40 523/160 |
| 2004/0252172 A1 | 12/2004 | Hiraoka et al. |
| 2005/0012798 A1 | 1/2005 | Adachi et al. |
| 2005/0051051 A1 | 3/2005 | Nitzan et al. |
| 2007/0197684 A1* | 8/2007 | Yamashita ......... C09D 11/54 523/160 |
| 2010/0149231 A1 | 6/2010 | Mori et al. |
| 2011/0081508 A1 | 4/2011 | Nitzan et al. |
| 2012/0287188 A1* | 11/2012 | Shimada ............ B41J 3/543 347/12 |

FOREIGN PATENT DOCUMENTS

| | | |
|---|---|---|
| JP | 2001-030616 A | 2/2001 |
| JP | 2002-103783 A | 4/2002 |
| JP | 2003-266916 A | 9/2003 |
| JP | 2004-010833 A | 1/2004 |
| JP | 2005-001259 A | 1/2005 |
| JP | 2006-507159 A | 3/2006 |
| JP | 2006-341407 A | 12/2006 |

(Continued)

*Primary Examiner* — Erica Lin
(74) *Attorney, Agent, or Firm* — Harness, Dickey & Pierce, P.L.C.

(57) ABSTRACT

An ink set includes a reaction liquid containing coagulant; a first ink containing a color material; and a second ink containing a color material. The ink set is used for recording on a non-absorptive recording medium or a low-absorptive recording medium and for imparting the reaction liquid, the first ink, and the second ink to the recording medium in a superimposed manner in this order.

22 Claims, 1 Drawing Sheet

(56) References Cited

FOREIGN PATENT DOCUMENTS

| | | |
|---|---|---|
| JP | 2010-023339 A | 2/2010 |
| JP | 2010-142965 A | 7/2010 |
| JP | 2010-241050 A | 10/2010 |
| JP | 2012-250416 A | 12/2012 |
| JP | 2013-071277 A | 4/2013 |
| JP | 2013-072045 A | 4/2013 |
| JP | 2013-244601 A | 12/2013 |

* cited by examiner

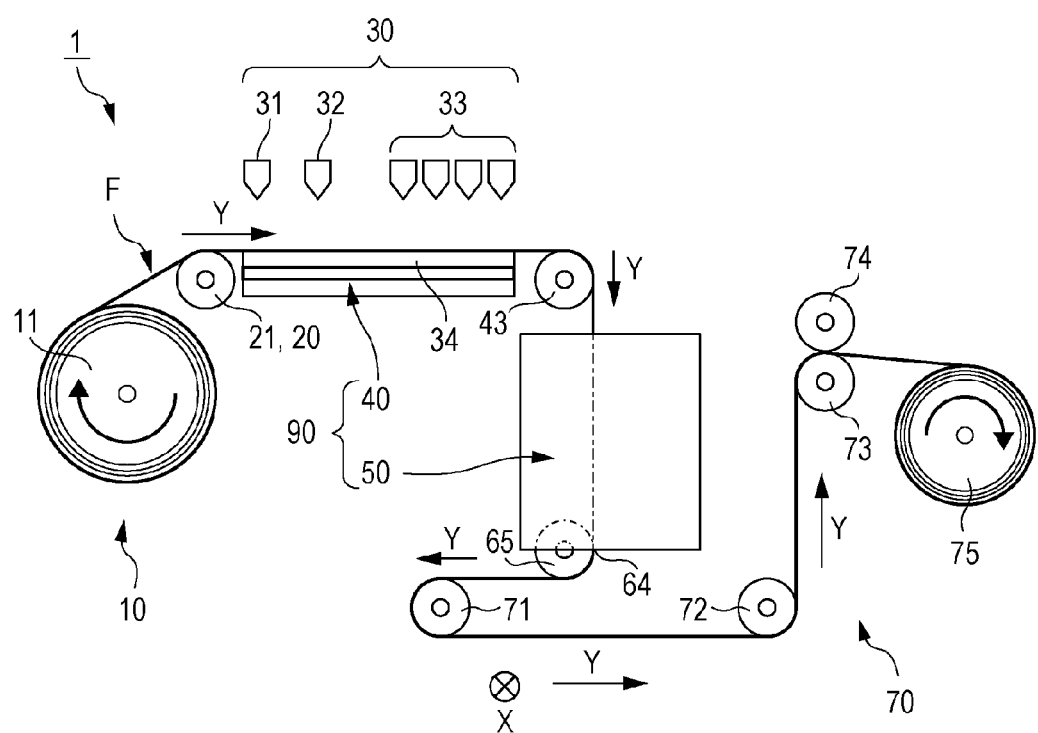

INK SET AND RECORDING METHOD USING THE SAME

BACKGROUND

1. Technical Field

The present invention relates to an ink set and a recording method using the same.

2. Related Art

An ink jet recording method has been rapidly developed in many areas as it is possible to record a high definition image using a comparatively simple device. For example, JP-A-2002-103783 discloses that recording is performed on an OHP sheet for ink jet printing using an ink composition containing titanium dioxide sol and a reaction liquid containing magnesium sulfate to form an image, for example, to realize formation of a white image having ink ejecting characteristics or high concealment when forming the white image through the ink jet recording method.

However, there is a problem in that bleeding of a color ink occurs when a color image is recorded on the white image using the color ink if the recording is performed on a non-absorptive recording medium or a low-absorptive recording medium using the ink jet recording method disclosed in JP-A-2002-103783.

In addition, a method of heating the recording medium can also be considered instead of using the reaction liquid to suppress the bleeding. However, there is a problem in that high energy for heating is required and clogging occurs if the recording medium is heated without using the reaction liquid.

SUMMARY

An advantage of some aspects of the invention is to provide an ink set in which it is possible to prevent bleeding among the inks and in which the clogging hardly occurs when a plurality of inks are recorded on a non-absorptive recording medium or a low-absorptive recording medium in a superimposed manner.

The present inventors have conducted extensive studies. As a result, the present inventors have completed an ink set including a predetermined liquid for pretreatment separately from the plurality of ink with respect to the non-absorptive recording medium or the low-absorptive recording medium.

That is, the invention is as follows.

[1] According to an aspect of the invention, there is provided an ink set including a reaction liquid containing coagulant; a first ink containing a color material; and a second ink containing a color material. The ink set is used for recording on a non-absorptive recording medium or a low-absorptive recording medium and for imparting the reaction liquid, the first ink, and the second ink to the recording medium in a superimposed manner in this order.

[2] In the ink set according to the above [1], at least any one of the first ink and the second ink may be a color ink containing a color material or a black ink containing a black color material.

[3] In the ink set according to the above [2], the other one of the first ink and the second ink may be a white ink containing a white color material or a metallic ink containing a metallic color material.

[4] In the ink set according to any one of the above [1] to [3], the coagulant may contain at least one selected from a group consisting of a polyvalent metal salt and an organic acid.

[5] In the ink set according to above [4], the ratio of the number of moles (unit: mol) of the polyvalent metal salt contained in the reaction liquid to the total mass (unit: g) of the color material contained in the first ink and the second ink may be 1000:1 to 31000:1(the color material: the polyvalent metal salt).

[6] In the ink set according to above [4] or [5], the ratio of the number of moles (unit: mol) of the organic acid contained in the reaction liquid to the total mass (unit: g) of the color material contained in the first ink and the second ink may be 800:1 to 5500:1(the color material: the organic acid).

[7] In the ink set according to any one of the above [1] to [6], the first ink may be the white ink containing the white color material or the metallic ink containing the metallic color material and the second ink may be the color ink containing the color material or the black ink containing the black color material.

[8] In the ink set according to any one of the above [1] to [7], a surface tension of the reaction liquid may be less than or equal to 55 mN/N at a temperature of 25° C.

[9] In the ink set according to any one of the above [1] to [8], the reaction liquid may further contain at least one selected from a group consisting of a component which becomes a receiving layer of an ink applied after the reaction liquid, and a cationic resin.

[10] In the ink set according to the above [9], the mass ratio of at least one (unit: g) selected from the group consisting of the component which becomes the receiving layer, and the cationic resin, which are contained in the reaction liquid, to the color material (unit: g) contained in the first ink may be 7:1 to 70:1(the color material: at least one selected from the group).

[11] According to another aspect of the invention, there is provided a recording method using the ink set according to any one of the above [1] to [10], the method including imparting a reaction liquid contained in the ink set to a non-absorptive recording medium or a low-absorptive recording medium; imparting a first ink contained in the ink set to the area to which the reaction liquid is imparted; and imparting a second ink contained in the ink set to the area to which the first ink is imparted.

[12] In the recording method according to the above [11], after the imparting of the first ink and before the imparting of the second ink, the volatilization amount of a volatile component contained in the reaction liquid and the first ink on the non-absorptive recording medium or the low-absorptive recording medium may be less than or equal to 95 mass % with respect to 100 total mass % of a volatile component of the reaction liquid and the first ink before the imparting.

[13] In the recording method according to the above [11] or [12], the ratio of the number of moles (unit: mol) of a polyvalent metal salt contained in the reaction liquid per unit area of the non-absorptive recording medium or the low-absorptive recording medium, to the total mass (unit: g) of a color material contained in the first ink and the second ink may be 1000:1 to 31000:1(the color material: the polyvalent metal salt).

[14] In the recording method according to the above [1] to [13], the ratio of the number of moles (unit: mol) of an organic acid contained in the reaction liquid per unit area of the non-absorptive recording medium or the low-absorptive recording medium, to the total mass (unit: g) of the color material contained in the first ink and the second ink may be 800:1 to 5500:1(the color material: the organic acid).

[15] In the recording method according to the above [11] to [14], the ratio of the mass (unit: g) of at least one selected from a group consisting of a component which becomes a receiving layer of the first ink and the second ink, and a cationic resin, which are contained in the reaction liquid per unit area of the non-absorptive recording medium or the low-absorptive recording medium, to the mass (unit: g) of the color material contained in the first ink-may be 7:1 to 70:1(the color material: at least one selected from the group).

BRIEF DESCRIPTION OF THE DRAWINGS

The invention will be described with reference to the accompanying drawings, wherein like numbers reference like elements.

FIGURE is a side view schematically showing an example of a whole ink jet recording apparatus that can be used in the present embodiment.

DESCRIPTION OF EXEMPLARY EMBODIMENTS

Hereinafter, an embodiment of the invention (hereinafter, referred to as "present embodiment") will be described in detail with reference to the drawings as necessary, but the invention is not limited thereto. Various modifications can be made within the scope not departing from the gist thereof. The same elements are given the same reference numerals and the description will not be repeated. In addition, the positional relation such as top, bottom, left, and right is based on the positional relation shown in the drawing unless otherwise specified. Furthermore, the ratio of the dimension is not limited to the ratio shown in the drawing.
Ink Set The ink set according to the present embodiment includes a reaction liquid containing coagulant; a first ink containing a color material; and a second ink containing a color material. The ink set is used for recording on a non-absorptive recording medium or a low-absorptive recording medium (hereinafter, also collectively referred to as "recording medium") and for imparting the reaction liquid, the first ink, and the second ink to the non-absorptive recording medium or the low-absorptive recording medium in a superimposed manner in this order. Hereinafter, the first ink and the second ink are also simply and collectively referred to as "ink".
Reaction Liquid The reaction liquid contains the coagulant. By using such reaction liquid, it is possible to obtain a recorded matter with good quality without heating the recording medium and to suppress clogging of a nozzle caused by the nozzle being dried or the like due to the heating of the recording medium. Specifically, with the inclusion of the coagulant, it is possible to coagulate a pigment contained in the first ink or a pigment contained in the second ink without heating. Thus, it is possible to prevent bleeding of the second ink and unevenness of the first ink, thereby obtaining the recorded matter with good quality.
Coagulant The coagulant is not particularly limited, but it is preferable that the coagulant contain at least one selected from a group consisting of a polyvalent metal salt and an organic acid, for example.
Polyvalent Metal Salt The polyvalent metal salt is not particularly limited, but for example, a polyvalent metal salt of an inorganic acid or a polyvalent metal salt of an organic acid is preferable. Such a polyvalent metal salt is not particularly limited, but examples thereof include a salt of alkaline earth metal (for example, magnesium and calcium) of a group 2 in the periodic table; a salt of transition metal (for example, lanthanum) of a group 3 in the periodic table; a salt of earth metal of a group 13 in the periodic table (for example, aluminum); and a salt of lanthanides (for example, neodymium). Carboxylate (formic acid, acetic acid, benzoate, or the like), sulfate, nitrate, chloride, and thiocyanate are suitable as these polyvalent metal salts. Among these, a calcium salt or a magnesium salt of carboxylate (formic acid, acetic acid, benzoate, or the like); a calcium salt or a magnesium salt of sulfate; a calcium salt or a magnesium salt of nitrate; calcium chloride; magnesium chloride; and a calcium salt or a magnesium salt of thiocyanate are preferable. The above-described polyvalent metal and the salt constituting the polyvalent metal salt may be a combination of the above and may be a hydrate. The polyvalent metal salt may be used alone or in a combination of two or more thereof.

The content of the polyvalent metal salt with respect to a total 100 mass % of the reaction liquid is preferably 0.5 mass % to 5 mass %, more preferably 0.5 mass % to 4 mass %, and still more preferably 1 mass % to 4 mass %. By setting the content of the polyvalent metal salt to be within the above-described range, the obtained recorded matter tends to be more excellent in the bleeding resistance.
Organic Acid The organic acid is not particularly limited, but examples thereof include phosphoric acid, oxalic acid, malonic acid, succinic acid, citric acid, and acetic acid. Among these, at least a monovalent carboxylic acid is preferable. With the inclusion of such carboxylic acid, the obtained recorded matter tends to be more excellent in the bleeding resistance. The organic acid may be used alone or in a combination of two or more thereof. In addition, the organic acid may be in a state of a salt. The organic acid salt is not particularly limited, but an example thereof includes the above-described salts of organic acids (where it is not overlapped to the above-described polyvalent metal salt). The above-described salts of the organic acids are not particularly limited, but an example thereof includes sodium acetate. The organic acid salt may be used alone or in a combination of two or more thereof.

The content of the organic acid with respect to a total 100 mass % of the reaction liquid is preferably 1 mass % to 15 mass %, more preferably 1 mass % to 14 mass %, and still more preferably 1 mass % to 7 mass %. By setting the content of the organic acid to be within the above-described range, the obtained recorded matter tends to be more excellent in the bleeding resistance.

It is preferable that the reaction liquid further contains at least one selected from a group consisting of a component (hereinafter, also simply referred to as "component of a receiving layer") which becomes a receiving layer of at least one of the first ink and the second ink, and a cationic resin.
Component which Becomes Receiving Layer of at Least One of First Ink and Second Ink By allowing the reaction liquid to contain the component of the receiving layer, the obtained recorded matter tends to be more excellent in the bleeding resistance and color developing property. The component of the receiving layer is not particularly limited, but examples thereof include an inorganic fine particle or a solid fine particle including a solid resin fine particle in liquid. Examples of such particles include a cationic particle, a nonionic particle, and an anionic particle. Among these, particles where a gap remains between fine particles in a state where the particles are adhered to a recording medium to form a coating film. The "gap" refers to a space in a state where the coating film of the reaction liquid is dried. When the reaction liquid is imparted to the recording medium and the coating film is formed, it is possible to make a gap between the fine particles in the coating film using the component which becomes the receiving layer and at least an ink imparted after the reaction liquid is absorbed in the gap. Therefore, the bleeding is further suppressed, which is more preferable. In general, the component which becomes the receiving layer is at least a component which becomes a receiving layer of the first ink. Furthermore, the component which becomes the receiving layer may be a receiving layer of the subsequently imparted second ink.

A particle with a cationic property exhibits an effect of forming a layer that receives the first ink or the second ink, and imparting a cohesive property. The cationic particle is not particularly limited, but an example thereof includes SNOWTEX ST-AK (trade name, manufactured by NISSAN CHEMICAL INDUSTRIES, LTD.).

A particle with an anionic property or a nonionic property forms a layer that receives the first ink or the second ink. The anionic particle or the nonionic particle is not particularly limited, but an example thereof includes anionic colloidal silica. An example of the commonly available anionic colloidal silica includes SNOWTEX ZL (trade name, manufactured by NISSAN CHEMICAL INDUSTRIES, LTD.).

The content of the component of the receiving layer with respect to a total 100 mass % of the reaction liquid is preferably 0.1 mass % to 10 mass %, and more preferably 0.1 mass % to 6 mass %. By setting the content of the component of the receiving layer to be within the above-described range, the obtained recorded matter tends to be more excellent in the bleeding resistance and color developing property. The component of the receiving layer may be used alone or in a combination of two or more thereof.

Cationic Resin

By allowing the reaction liquid to contain a cationic resin, the obtained recorded matter tends to be more excellent in the bleeding property and the color developing property. The cationic resin is not particularly limited, but examples thereof include a resin which is soluble in the reaction liquid and a resin which shows a dispersion state in liquid such as resin emulsion. The interaction between the cationic resin and the pigment contained in the first ink or the second ink is comparatively weak compared to the above-described coagulant, and therefore, the cationic resin works as an auxiliary agent of the coagulant rather than working as the coagulant. A resin which is soluble in the reaction liquid is preferable in terms of excellent interaction.

The resin which is soluble in the reaction liquid is not particularly limited, but an example thereof include an amine-based resin, and examples of the amine-based resin include polyallylamine and polyallylamine derivatives.

The resin emulsion is not particularly limited, but examples thereof include a polyolefin-based resin, a urethane-based resin, an acrylic-based resin, and a polyester-based resin. Another example thereof includes resin emulsion that can be included in the ink to be described later. A preferable example of commonly available resin emulsion includes Arobase CD-1200 (trade name, manufactured by UNITIKA LTD., polyolefin-based resin).

The content of the cationic resin with respect to a total 100 mass % of the reaction liquid is preferably 0.1 mass % to 10 mass %, and more preferably 0.1 mass % to 6 mass %. By setting the content of the cationic resin to be within the above-described range, the obtained recorded matter tends to be excellent in the bleeding resistance and the color developing property. The cationic resin may be used alone or in a combination of two or more thereof.

The reaction liquid can also contain a solvent, a surfactant, or the like in addition to the above.

Solvent

It is preferable that the reaction liquid in the present embodiment further include a solvent. The solvent is not particularly limited, and for example, an organic solvent or water can be used as the solvent.

Examples of water include water from which ionic impurities are removed as much as possible, for example, pure water or ultrapure water such as ion-exchanged water, ultra-filtered water, reverse osmosis water, and distilled water. In addition, use of water which is sterilized by irradiation with ultraviolet light, addition of hydrogen peroxide, or the like can prevent generation of mold or bacteria during long-term preservation of the reaction liquid. Accordingly, the storage stability tends to be further improved.

The content of the water with respect to total 100 parts by mass of the reaction liquid is preferably 80 parts by mass to 95 parts by mass, and more preferably 85 parts by mass to 95 parts by mass. By setting the range of the content of the water to be within the above-described range, the viscosity tends to become low.

A volatile water-soluble organic solvent is more preferable as the organic solvent. The organic solvent is not particularly limited, but specific examples thereof include alcohols or glycols such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide; N,N-dimethylacetamide; 2-pyrrolidone; N-methyl-2-pyrrolidone; 2-oxazolidone; 1,3-dimethyl-2-imidazolidinone; dimethyl sulfoxide; sulfolane; and 1,1,3,3-tetramethyl urea.

The organic solvent may be used alone or in a combination of two or more thereof. The content of the organic solvent is not particularly limited and can be appropriately set as necessary. Among these, it is preferable to use one or more selected from a group consisting of 1,2-hexanediol, triethylene glycol monobutyl ether, and dipropylene glycol mono-propyl ether.

The content of the organic solvent with respect to a total 100 mass % of the reaction liquid is preferably 1 mass % to 10 mass %.

Surfactant

It is preferable that the reaction liquid used in the present embodiment contain a surfactant. The surfactant is not particularly limited, but preferable examples thereof include at least one selected from a group consisting of an acetylene glycol-based surfactant and a polysiloxane-based surfactant.

Among these, the polysiloxane-based surfactant is more preferable since its solubility to the reaction liquid becomes high and foreign materials are hardly generated in the reaction liquid.

The above-described acetylene glycol-based surfactant is not particularly limited, but preferable examples thereof include one or more selected from 2,4,7,9-tetramethyl-5-decyne-4,7-diol and an alkylene oxide adduct of 2,4,7,9-tetramethyl-5-decyne-4,7-diol, and 2,4-dimethyl-5-decyne-4-ol and an alkylene oxide adduct of 2,4-dimethyl-5-decyne-4-ol. These are commonly available products such as an Olfine 104 series or an E series such as Olfine E1010 (trade name, manufactured by Air Products Japan, Inc.), and Olfine PD-002W, Surfynol 465 or Surfynol 61 (trade name, manufactured by Nissin Chemical Industry Co., Ltd.).

In addition, the polysiloxane-based surfactant is not particularly limited, but examples thereof include BYK-347 and BYK-348 (BYK Japan KK).

The content of the above-described surfactant with respect to a total 100 mass % of the reaction liquid is preferably 0.1 mass % to 3 mass %.

The surface tension of the reaction liquid is preferably less than or equal to 55 mN/N, and more preferably less than or equal to 40 mN/N at a temperature of 25° C. By setting the surface tension to be within the above-described range, it is possible to uniformly coat the reaction liquid while performing the recording on the recording medium. In addition, the lower limit of the surface tension of the reaction liquid is not particularly limited, but it is preferable that the lower limit of the surface tension be greater than or equal to 1 mN/N at the temperature of 25° C. It is possible to measure the surface tension through the method described in Examples.

First Ink

The first ink contains a color material. The content of the color material in the first ink with respect to a total 100 mass % of the first ink is preferably 2 mass % to 15 mass %, and more preferably 3 mass % to 13 mass %. By setting the content of the color material to be within the above-described range, the obtained recorded matter tends to be more excellent in the bleeding resistance and the color developing property.

Second Ink

The second ink contains a color material. The content of the color material in the second ink with respect to a total 100 mass % of the second ink is preferably 2 mass % to 15 mass %, and more preferably 3 mass % to 13 mass %. By setting the content of the color material to be within the above-described range, the obtained recorded matter tends to be more excellent in the bleeding resistance and the color developing property.

Color Material

The color material that can be contained in the first ink and the second ink will be described hereinafter. The first ink and the second ink may respectively contain a single color material or two or more of color materials. In addition, it is preferable that the color material be a dye or a pigment.

An example of a black color material used in a black ink includes carbon black. The carbon black is not particularly limited, but examples thereof include No. 2300, No. 900, MCF88, No. 33, No. 40, No. 45, No. 52, MA7, MA8, MA100, No. 2200B, or the like (all are manufactured by Mitsubishi Chemical Corporation); Raven 5750, Raven 5250, Raven 5000, Raven 3500, Raven 1255, Raven 700, or the like (all are manufactured by Carbon Columbia); Regal 400R, Regal 330R, Regal 660R, Mogul L, Monarch 700, Monarch 800, Monarch 880, Monarch 900, Monarch 1000, Monarch 1100, Monarch 1300, Monarch 1400, or the like (manufactured by CABOT JAPAN K.K.); Color Black FW1, Color Black FW2, Color Black FW2V, Color Black FW18, Color Black FW200, Color Black 5150, Color Black 5160, Color Black 5170, Printex 35, Printex U, Printex V, Printex 140U, Special Black 6, Special Black 5, Special Black 4A, Special Black 4, or the like (all are manufactured by Degussa).

Color materials used in a white ink are not particularly limited, but examples thereof include C.I. Pigment Whites 6, 18, and 21. Other examples of pigments used in the white ink include alkaline earth metal sulfates such as barium sulfates; alkaline earth metal carbonates such as calcium carbonates; silicas such as fine silicic acid or synthetic silicate; metal compounds such as calcium silicate, alumina, hydrated alumina, titanium dioxide, and zinc oxide; talc; and clay.

Color materials used in an yellow ink are not particularly limited, but examples thereof include C.I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Color materials used in a magenta ink are not particularly limited, but examples thereof include C.I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48 (Ca), 48 (Mn), 57 (Ca), 57:1, 88, 112, 114, 122, 123, 144, 146, 149, 150, 166, 168, 170, 171, 175, 176, 177, 178, 179, 184, 185, 187, 202, 209, 219, 224, and 245, and C.I. Pigment Violets 19, 23, 32, 33, 36, 38, 43, and 50.

Color materials used in a cyan ink are not particularly limited, but examples thereof include C. I. Pigment Blues 1, 2, 3, 15, 15:1, 15:2, 15:3, 15:34, 15:4, 16, 18, 22, 25, 60, 65, and 66, and C. I. Bat Blues 4 and 60.

Other color materials except for magenta, cyan, and yellow color materials are not particularly limited, but examples thereof include C.I. Pigment Greens 7 and 10, C.I. Pigment Browns 3, 5, 25, and 26, and C.I. Pigment Oranges 1, 2, 5, 7, 13, 14, 15, 16, 24, 34, 36, 38, 40, 43, and 63.

An example of a metallic color material used in a metallic ink includes a metallic pigment. Metal micro-particles can be used in the metallic ink and examples of the metal include aluminum, aluminum alloy, and silver. The metallic ink is an ink in which a pattern which is imparted to and formed on the recording medium has a metallic luster and the metallic pigment is a pigment that expresses the metallic luster.

It is preferable that at least any one of the first ink and the second ink be a color ink containing a color material or a black ink containing a black color material. In addition, it is more preferable that any one of the first ink and the second ink be the color ink containing the color material or the black ink containing the black color material, and the other one of the first ink and the second ink be a white ink containing a white color material. By setting the ink set in this manner, it is possible to obtain the color developing property with respect to a recording medium except for the white color when performing the recording on the non-absorptive recording medium or the low-absorptive recording medium. For example, a transparent medium, a color medium, a metallic medium, and the like are suitably used.

It is preferable that the first ink be the white ink containing the white color material and the second ink be the color ink containing the color material or the black ink containing the black color material. By setting the ink set in this manner, it is possible to obtain the color developing property with respect to a recording medium except for the white color when performing the recording on the non-absorptive recording medium or the low-absorptive recording medium. For example, the transparent medium, the color medium, the metallic medium, and the like are suitably used.

The ratio A of the number of moles (unit: mol) of the coagulant contained in the reaction liquid to the total mass (unit: g) of the color material contained in the first ink and the second ink is preferably 100:1 to 5000:1, and more preferably 500:1 to 4000:1. By setting the ratio A to be greater than or equal to 100:1, it is possible to prevent precipitation of the reaction liquid, cloudiness due to the reaction liquid, stickiness, and the generation of a bad odor. In addition, by setting the ratio A to be less than or equal to 5000:1, it is possible to suppress the bleeding when superimposing inks.

The ratio B of the number of moles (unit: mol) of the polyvalent metal salt contained in the reaction liquid to the total mass (unit: g) of the color material contained in the first ink and the second ink is preferably 300:1 to 5000:1, and more preferably 500:1 to 5000:1. By setting the ratio B to be greater than or equal to 300:1, it is possible to prevent precipitation of the polyvalent metal salt, cloudiness due to the polyvalent metal salt, stickiness, and the generation of a bad odor. In addition, by setting the ratio B to be less than or equal to 5000:1, it is possible to suppress the bleeding when superimposing inks.

The ratio C of the number of moles (unit: mol) of the organic acid contained in the reaction liquid to the total mass (unit: g) of the color material contained in the first ink and the second ink is preferably 100:1 to 800:1, and more preferably 100:1 to 700:1. By setting the ratio C to be greater than or equal to 100:1, it is possible to prevent precipitation of the organic acid, cloudiness due to the organic acid, stickiness, and the generation of a bad odor. In addition, by setting the ratio C to be less than or equal to 800:1, it is possible to suppress the bleeding when superimposing inks.

The ratio D of the mass (unit: g) of at least one selected from the group consisting of a component of a receiving layer and the a cationic resin which are contained in the reaction liquid, to the mass (unit: g) of the color material contained in the first ink is preferably 1:1 to 10:1, and more preferably 1:1 to 5:1. By setting the ratio D to be greater than or equal to 1:1 (the former), the bleeding tends to be further suppressed as the function of suppressing the bleeding of the coagulant is further assisted. In addition, by setting the ratio D to be less than or equal to 10:1 (the former), the storage stability of the reaction liquid, or the clogging reliability when being coated with the ink jet tends to be more excellent.

As these are apparent from table 2, the ratio A is the ratio of (the color material: the coagulant), the ratio B is the ratio of (the color material: the polyvalent metal salt), the ratio C is the ratio of (the color material: the organic acid), the ratio D is the ratio of (the color material: at least one kind that is selected from group).

Each ratio (A, B, C, D) are comparison at unit mass of the reaction liquid and the unit mass of the first ink and the unit mass of the second ink.

When using the pigment as the above-described color material, it is preferable that the pigment be added to the ink as a pigment dispersing liquid which is obtained by dispersing the pigment in water using a dispersant, or as a pigment dispersing liquid which is obtained by dispersing a self-dispersion type surface-treated pigment in which a hydrophilic group is introduced to the surface of the pigment particle using a chemical reaction, or obtained by dispersing a pigment covered with a polymer.

The above-described dispersant is not particularly limited, but for example, polymeric dispersants (proteins such as glue, gelatin, casein, and albumin; natural gums such as gum arabic and tragacanth; glucosides such as saponin; alginic acid ferments such as alginic acid, propylene glycol ester, triethanolamine alginate, and ammonium alginate; cellulose derivatives such as methyl cellulose, carboxymethyl cellulose, and ethyl hydroxy cellulose; polyvinyl alcohols; polypyrrolidones; acrylic-based resins such as polyacrylic acid, acrylic acid-acrylonitrile copolymers, potassium acrylate-acrylonitrile copolymers, vinyl acetate-acrylic ester copolymers, and acrylic acid-acrylic acid ester copolymers; styrene-acrylic resins such as styrene-acrylic acid copolymers, styrene-methacrylic acid copolymers, styrene-methacrylic acid-acrylic acid ester copolymers, styrene-m-methyl-styrene-acrylic acid copolymers; vinyl acetate-based copolymers such as styrene-maleic acid copolymers, styrene-maleic anhydride copolymers, vinyl naphthalene-acrylic acid copolymers, vinyl acetate-ethylene copolymers, vinyl acetate-fatty acid vinyl ethylene copolymers, vinyl acetate-maleic acid ester copolymers, vinyl acetate-crotonic copolymers, vinyl acetate-acrylic acid copolymers, and salts thereof) or surfactants (various anionic surfactants, nonionic surfactants, amphoteric surfactants) can be used.

The above-described self-dispersion type surface-treated pigment to which the hydrophilic group is introduced is a pigment which can be dispersed or dissolved in the water without using the dispersant through the surface treatment in which a carboxyl group or a salt thereof is directly connected to the surface of the pigment. Specifically, it is possible to obtain a grafted functional group or a grafted molecule containing the functional group by grafting the functional group or the molecule containing the functional group on the surface of the pigment through physical treatment such as vacuum plasma or chemical treatment using an oxidizing agent such as sodium hypochlorite or ozone. The functional group grafted on a pigment particle may be a single kind or multiple kinds. The type and degree of the grafted functional group may be appropriately set while considering dispersion stability in the ink, color density, and drying properties in a front face of an ink jet head.

In addition, the pigment covered with the above-described polymer is not particularly limited, but for example, after dispersing the pigment using the dispersant having a polymerizable group, it is possible to obtain the covered pigment by performing emulsion polymerization in the water using a monomer (copolymerizable monomer) which is copolymerizable with the dispersant and a photoradical polymerization initiator. Among the polymers, a monomer which has at least one selected from a group consisting of acryloyl group, methacryloyl group, a vinyl group, and an allyl group as double bonds, or an oligomer which is polymerized according to a well-known polymerization method using a photoradical polymerization initiator can be suitably used. For the emulsion polymerization, a general method can be used and the polymerization is progressed using a free radical generated by thermal decomposition of a water-soluble photoradical polymerization initiator in the presence of an emulsifier.

The pigment configuring the above-described pigment dispersing liquid and the dispersant may be respectively used alone or in a combination of two or more thereof.

Resin Emulsion

In a case where the ink used in the present embodiment contains a pigment as a color material, it is preferable to further contain a resin emulsion. With the use of the resin emulsion, resins themselves and a resin and a pigment in the resin emulsion are mutually fused in accordance with drying of the ink to fix the pigment to the recording medium. Therefore, it is possible to enhance friction resistance and adhesiveness of the image portion of the recorded matter. Among the resin emulsions, a urethane resin emulsion and acrylic resin emulsion are preferable, and the urethane resin emulsion is more preferable. Accordingly, the ink becomes excellent in fixing properties, thereby becoming excellent in the friction resistance and the adhesiveness of the recorded matter as well.

In a case where the resin emulsion contains the ink, the resin emulsion becomes excellent in the friction resistance of the recorded medium by sufficiently fixing the ink on the recording medium through the formation of a resin coating film on the recording medium. For this reason, it is preferable that the resin emulsion contain a thermoplastic resin. In particular, the urethane resin emulsion has high flexibility in design, and thus, it is easy to obtain desired physical properties of the film.

In addition, an anionic resin emulsion is also preferable. A resin containing the anionic resin emulsion is not particularly limited, but examples thereof include a homopolymer or a copolymer of (meth)acrylic acid, (meth)acrylic acid ester, acrylonitrile, cyanoacrylate, acrylamide, olefin, styrene, vinyl acetate, vinyl chloride, vinyl alcohol, vinyl ethers, vinyl pyrrolidone, vinyl pyridine, vinyl carbazole, vinyl imidazole, and vinylidene chloride; fluororesins; and natural resins. Among these, at least one selected from a group consisting of a (meth)acrylic-based resin and a styrene-(meth)acrylic acid copolymer-based resin is preferable, at least one selected from a group consisting of an acrylic-based resin and a styrene-acrylic acid copolymer-based resin is more preferable, and the styrene-acrylic acid copolymer-based resin is still more preferable. The above-described copolymer may be in any form of a random copolymer, a block copolymer, an alternating copolymer, and a graft copolymer.

A resin emulsion obtained using a well-known material and through a well-known production method may be used and a commonly available resin emulsion may be used as the resin emulsion. The commonly available resin emulsion is not particularly limited, but examples thereof include Mowinyl 966A (trade name of an acrylic resin emulsion, manufactured by Nippon Synthetic Chemical Industry Co., Ltd.); Microgel E-1002 and Microgel E-5002 (all are trade names, manufactured by Nippon Paint Co., Ltd.); Boncoat 4001 and Boncoat 5454 (all are trade names, manufactured by DIC Corporation); SAE 1014 (trade name, manufactured by Zeon Corporation); Saivinol SK-200 (trade name, manufactured by Saiden Chemical Industry Co., Ltd.); Joncryl 7100, Joncryl 390, Joncryl 711, Joncryl 511, Joncryl 7001, Joncryl 632, Joncryl 741, Joncryl 450, Joncryl 840, Joncryl 62J, Joncryl 74J, Joncryl HRC-1645J, Joncryl 734, Joncryl 852, Joncryl 7600, Joncryl 775, Joncryl 537J, Joncryl 1535, Joncryl PDX-7630A, Joncryl 352J, Joncryl 352D, Joncryl PDX-7145, Joncryl 538J, Joncryl 7640, Joncryl 7641, Joncryl 631, Joncryl 790, Joncryl 780, and Joncryl 7610 (all are trade names, manufactured by BASF Japan); and NK binder R-5HN (trade name of an acrylic resin emulsion, 44% of solid content, manufactured by Shin-Nakamura Chemical Co., LTD.). Among these, Mowinyl 966A which is the acrylic resin emulsion is preferable as it sufficiently satisfies the preferable physical property of the resin emulsion described above.

The resin emulsion may be used alone or in a combination of two or more thereof.

The content of the resin of the resin emulsion with respect to a total 100 mass % of each ink is preferably 3 mass % to 15 mass %, more preferably 7 mass % to 14 mass %, and still more preferably 8 mass % to 13 mass %. By setting the content thereof to be within the above-described range, the recorded matter tends to be more excellent in the adhesiveness and the friction resistance and the ink tends to be excellent in long-term storage stability, thereby the ink can be particularly made to have low viscosity.

Solvent

It is preferable that the ink in the present embodiment further include a solvent. The solvent is not particularly limited, and for example, an organic solvent or water can be used as the solvent.

Examples of water include water from which ionic impurities are removed as much as possible, for example, pure water or ultrapure water such as ion-exchanged water, ultra-filtered water, reverse osmosis water, and distilled water. In addition, use of water which is sterilized by irradiation with ultraviolet light, addition of hydrogen peroxide, or the like can prevent generation of mold or bacteria during long-term preservation of the ink. Accordingly, the storage stability tends to be further improved.

A volatile water-soluble organic solvent is more preferable as the organic solvent. The organic solvent is not particularly limited, but specific examples thereof include alcohols or glycols such as glycerin, ethylene glycol, diethylene glycol, triethylene glycol, propylene glycol, dipropylene glycol, 1,3-propanediol, 1,2-butanediol, 1,2-pentanediol, 1,2-hexanediol, 1,4-butanediol, 1,5-pentanediol, 1,6-hexanediol, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol monobutyl ether, diethylene glycol mono-t-butyl ether, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, dipropylene glycol mono-iso-propyl ether, diethylene glycol dimethyl ether, diethylene glycol diethyl ether, diethylene glycol dibutyl ether, diethylene glycol ethyl methyl ether, diethylene glycol butyl methyl ether, triethylene glycol dimethyl ether, tetraethylene glycol dimethyl ether, dipropylene glycol dimethyl ether, dipropylene glycol diethyl ether, tripropylene glycol dimethyl ether, methanol, ethanol, n-propyl alcohol, iso-propyl alcohol, n-butanol, 2-butanol, tert-butanol, iso-butanol, n-pentanol, 2-pentanol, 3-pentanol, and tert-pentanol; N,N-dimethylformamide; N,N-dimethylacetamide; 2-pyrrolidone; N-methyl-2-pyrrolidone; 2-oxazolidone; 1,3-dimethyl-2-imidazolidinone; dimethyl sulfoxide; sulfolane; and 1,1,3,3-tetramethyl urea.

The organic solvent may be used alone or in a combination of two or more thereof. The content of the organic solvent is not particularly limited and can be appropriately set as necessary. Among these, it is preferable to use one or more selected from a group consisting of 1,2-hexanediol, triethylene glycol monobutyl ether, and dipropylene glycol mono-propyl ether.

Surfactant

It is preferable that the ink used in the present embodiment contain a surfactant. The surfactant is not particularly limited, but preferable examples thereof include at least one selected from a group consisting of an acetylene glycol-based surfactant and a polysiloxane-based surfactant. By allowing the ink to contain these surfactants, it is possible to realize high speed recording as the drying properties of the ink adhered to the recording medium are enhanced.

Among these, the polysiloxane-based surfactant is more preferable since its solubility to the ink becomes high and foreign materials are hardly generated in the ink.

The above-described acetylene glycol-based surfactant is not particularly limited, but preferable examples thereof include one or more selected from 2,4,7,9-tetramethyl-5-decyne-4,7-diol and an alkylene oxide adduct of 2,4,7,9-tetramethyl-5-decyne-4,7-diol, and 2,4-dimethyl-5-decyne-4-ol and an alkylene oxide adduct of 2,4-dimethyl-5-decyne-4-ol. These are commonly available products such as an Olfine 104 series or an E series such as Olfine E1010 (trade name, manufactured by Air Products Japan, Inc.), and Olfine PD-002W, Surfynol 465 or Surfynol 61 (trade name, manufactured by Nissin Chemical Industry Co., Ltd.).

In addition, the polysiloxane-based surfactant is not particularly limited, but examples thereof include BYK-347 and BYK-348 (BYK Japan KK).

Moisturizing Agent

It is preferable that the ink used in the present embodiment further contain a moisturizing agent (wetting agent). The moisturizing agent is not particularly limited as long as the moisturizing agent is generally used in the ink jet ink. The boiling point of the moisturizing agent is preferably higher than or equal to 180° C., and more preferably higher than or equal to 200° C. By setting the boiling point to be within the above-described range, it is possible to impart favorable water-holding properties and wetting properties to the ink.

The moisturizing agent with the high boiling point is not particularly limited, but examples thereof include ethylene glycol, propylene glycol, diethylene glycol, triethylene glycol, pentamethylene glycol, trimethylene glycol, 2-butene-1,4-diol, 2-ethyl-1,3-hexanediol, 2-methyl-2,4-pentanediol, tripropylene glycol, polyethylene glycol with number average molecular weights of less than or equal to 2000, 1,3-propylene glycol, isopropylene glycol, isobutylene glycol, glycerol, meso-erythritol, and pentaerythritol.

The moisturizing agent may be used alone or in a combination of two or more thereof. By allowing the ink to contain the moisturizing agent with the high boiling point, it is possible to obtain an ink that can maintain fluidity and re-dispersibility for a long period of time even if the pigment ink is left to stand in a state of coming into contact with the air in an open state. Furthermore, such an ink hardly causes clogging of a nozzle in the middle of the recording or upon restarting after interruption of the printing, using a recording apparatus, and therefore, the ink becomes excellent in the discharge stability.

Other Components

In the ink used in the present embodiment, in order to favorably maintain the storage stability and the discharge stability from the head, to improve the clogging, and to prevent the ink from deterioration, it is possible to appropriately add various additives such as dissolution aids, viscosity modifiers, pH adjusting agents, antioxidants, preservatives, anti-mold agents, corrosion inhibitors, and chelating agents for capturing a metal ion that influences the dispersion. It is preferable that the ink used in the present embodiment be a water-based ink which contains mostly water among the volatile components in terms of safety.

Recording Medium

The ink set according to the present embodiment is used for recording on the non-absorptive recording medium or the low-absorptive recording medium. An absorptive recording medium is inferior to water resistance, friction resistance, or the like, and in some cases, the manufacturing cost increases in a case of an absorptive recording medium which is constituted by providing a receiving layer of an ink to the surface. On the other hand, the non-absorptive recording medium or the low-absorptive recording medium is excellent in the water resistance, the friction resistance, and reducing the manufacturing cost compared to the absorptive recording medium which is constituted by providing the receiving layer of the ink on the surface. The bleeding is easily generated with the low-absorptive recording medium and the bleeding is further easily generated with the non-absorptive recording medium. It is difficult to satisfy both the generation of the bleeding and the printing speed, and therefore, it is effective to use the ink set according to the present embodiment and the non-absorptive recording medium is more efficient.

Here, the "low-absorptive recording medium" or the "non-absorptive recording medium" refers to a recording medium having an amount of water absorption of less than or equal to 10 mL/m$^2$ from the start of contact until 30 msec in a Bristow's method. The Bristow's method is the most common method as a method of measuring the amount of liquid absorption in a short period of time and is also employed in JAPAN TAPPI. The details of the test method are described in "JAPAN TAPPI Paper Pulp Test Methods, 2000 version", Standard No. 51, "Paper and Paperboard—Liquid Absorption Test Method—Bristow's method".

In addition, the non-absorptive recording medium or the low-absorptive recording medium can also be classified in accordance with wettability of water on a recording surface. For example, the recording medium can be characterized by dripping 0.5 μL of a water droplet to the recording surface of the recording medium to measure the reduction rate of a contact angle (comparing a contact angle at 0.5 msec after impact to a contact angle at 5 sec after the impact). More specifically, as characteristics of the recording medium, the non-absorbency of the "non-absorptive recording medium" indicates that the above-described reduction rate is less than 1% and the low-absorbency of the "low-absorptive recording medium" indicates that the reduction rate is 1% to less than 5%. In addition, the absorbency indicates that the above-described reduction rate is greater than or equal to 5%. It is possible to measure the contact angle using Portable Contact Angle Meter PCA-1 (manufactured by Kyowa Interface Science Co., Ltd.) or the like.

The low-absorptive recording medium is not particularly limited, but an example thereof includes coated paper in which a coating layer for receiving an oil-based ink is provided on the surface. The coated paper is not particularly limited, but examples thereof include recording papers such as art paper, coated paper, and matte paper.

The non-absorptive recording medium is not particularly limited, but examples thereof include a base material such as a plastic film or paper and which has no absorptive layer of an ink to which plastic is coated; or a base material to which a plastic film is attached. Examples of the plastic referred herein include polyvinyl chloride, polyethylene terephthalate, polycarbonate, polystyrene, polyurethane, polyethylene, and polypropylene.

In addition to the above-described recording media, ink non-absorbent or low-absorbent recording media such as glass or plates of metals such as iron, silver, copper, and aluminum can also be used.

Recording Method

The recording method according to the present embodiment includes a reaction liquid imparting step of imparting a reaction liquid to a non-absorptive recording medium or a low-absorptive recording medium; a first step of imparting a first ink to the top of the reaction liquid; and a second step of imparting a second ink to the top of the first ink using the above-described ink set.

FIGURE is a side view schematically showing an example of a whole ink jet recording apparatus 1 that can be used in the present embodiment. As shown in FIGURE, the ink jet recording apparatus 1 has a feeding unit 10, a transporting unit 20, a recording unit 30, a drying device 90, and a discharging unit 70 of a recording medium. In addition, the ink jet recording apparatus 1 also may have a pre-heater, which is not shown, to heat the recording medium F from the beginning.

Of these, the drying device 90 has a first drying unit 40 which performs a step of drying the recording medium and a second drying unit 50 which dries a recorded matter obtained through the recording method according to the present embodiment.

In addition, the feeding unit 10 is provided such that the recording medium F can be fed to the transporting unit 20. Specifically, the feeding unit 10 has roll medium holder 11 which holds recording media F. The feeding unit is configured such that the recording medium F can be fed to the transporting unit 20 in a downstream side in a feeding direction Y by rotating the recording medium F. The recording medium F is not limited to have a roll shape.

Furthermore, the transporting unit 20 is provided such that the recording medium F which is fed from the feeding unit 10 can be transported to the recording unit 30. Specifically, the transporting unit 20 has a first feeding roller 21 and is configured such that the fed recording medium F can be further transported to the recording unit 30 in the downstream side in the feeding direction Y.

In addition, the recording unit 30 is provided such that the reaction liquid can be imparted to the recording medium F which is fed from the transporting unit 20 and the ink can be discharged for the recording. Specifically, the recording unit 30 has a head 31 that performs the reaction liquid imparting step; a head 32 that performs the first step; a recording head 33 that performs the second step; and a platen 34 as a medium supporting unit. The method of imparting the reaction liquid and the ink is not limited to the ink jet, and in particular, the reaction liquid may be imparted through roller coating, press coating, or the like. The ink jet is preferable in that it is possible to highly precisely impart an imparting position or an imparting amount to a required area.

Of these, the platen 34 is provided such that the recording medium F can be supported from a back surface. In addition, the platen 34 is provided with a first drying unit 40 that dries the reaction liquid imparted to the recording medium F and the ink discharged to the recording medium F. Furthermore, a second feeding roller 43 is provided in the downstream side in the feeding direction Y from the platen 34. The second feeding roller 43 is configured such that the recorded recording medium F can be fed to the second drying unit 50 in the downstream side in the feeding direction Y.

In addition, the second drying unit 50 is configured such that it is possible to further dry the reaction liquid imparted to the recording medium F and the ink discharged to the recording medium F. Furthermore, a third feeding roller 65 is provided in the vicinity of an outlet 64 of the second drying unit 50. The third feeding roller 65 is disposed so as to come into contact with the back surface of the recording medium F and is configured such that it is possible to feed the recording medium F to the discharging unit 70 in the downstream side in the feeding direction Y.

Furthermore, the discharging unit 70 is provided such that it is possible to further feed the recording medium F which is fed from the second drying unit 50 in the downstream side of the feeding direction Y and to discharge the fed recording medium F to the outside of the ink jet recording apparatus 1. Specifically, the discharging unit 70 has a fourth feeding roller 71, a fifth feeding roller 72, a sixth feeding roller 73, a seventh feeding roller 74, and a winding roller 75. Of these, the fourth feeding roller 71 and the fifth feeding roller 72 are disposed so as to coming into contact with the surface of the recording medium F. In addition, the sixth feeding roller 73 and the seventh feeding roller 74 are disposed so as to be paired with each other. The recording medium F which is discharged by the sixth feeding roller 73 and the seventh feeding roller 74 is provided to be wound by the winding roller 75.

Reaction Liquid Imparting Step

The reaction liquid imparting step is a step of imparting a reaction liquid on a non-absorptive recording medium or a low-absorptive recording medium. The imparting means is not particularly limited, but roller coating, spray coating, and ink jet coating can be used. During the reaction liquid imparting step or after the reaction liquid imparting step, there may be a step of drying at least a portion of the reaction liquid coated on the recording medium.

The amount of the reaction liquid imparted to the recording medium is preferably 1 mg/inch$^2$ to 10 mg/inch$^2$, and more preferably 1 mg/inch$^2$ to 5 mg/inch$^2$. By setting the imparted amount of the reaction liquid to be within the above-described range, the obtained recorded matter tends to be excellent in the bleeding resistance.

The amount of the coagulant imparted to the recording medium is preferably $0.5 \times 10^{-4}$ to $15 \times 10^{-4}$ mmol/inch$^2$ (50 to 1,500 nmol/inch$^2$), and more preferably $0.65 \times 10^{-4}$ mmol/inch$^2$ or more, and further preferably $1 \times 10^{-4}$ mmol/inch$^2$ or more, and further preferably $1.5 \times 10^{-4}$ mmol/inch$^2$ or more, and further preferably $2 \times 10^{-4}$ mmol/inch$^2$ or more, and further preferably $3 \times 10^{-4}$ mmol/inch$^2$ or more. And the amount of the coagulant imparted to the recording medium is more preferably $10.8 \times 10^{-4}$ mmol/inch$^2$ or less, and further preferably $10 \times 10^{-4}$ mmol/inch$^2$ or less, and further preferably $5 \times 10^{-4}$ mmol/inch$^2$ or less, By setting the imparted amount of the coagulant to be within the above-described range, the obtained recorded matter tends to be excellent in the image quality et al and the value of later ratio F, G, H tend to be set in later ranges. The amount of the reaction liquid or the coagulant imparted to the recording medium are an amount of the reaction liquid or the coagulant imparted to the recording medium where the first ink and the second ink are imparted coming into contact.

First Step

The first step is a step of imparting a first ink to the top of the reaction liquid. At this time, the first ink can be promptly coagulated as the reaction liquid and the first ink are directly reacted to each other and the reaction liquid does not have to be completely dried. Since the reaction liquid does not have to be completely dried or does not have to be dried at all, it is possible to start the imparting of the first ink early, thereby achieving the high recording speed. During the first step or after the first step, there may be a step of drying at least a portion of the reaction liquid and the first ink which are coated on the recording medium.

The amount of the imparted first ink in the first step is preferably 2 mg/inch$^2$ to 20 mg/inch$^2$, and more preferably 5 mg/inch$^2$ to 15 mg/inch$^2$. By setting the imparted amount of the first ink to be within the above-described range, the obtained recorded matter tends to be excellent in the bleeding resistance, clogging reliability, and stickiness.

Second Step

The second step is a step of imparting a second ink to the top of the first ink. At this time, the reaction liquid and the first ink do not have to be completely dried. By imparting the second ink in a state where the first ink is not completely dried, it is possible to react the second ink with the reaction liquid even on the top of the first ink, and it is possible to achieve the high recording speed as the second ink can be imparted while suppressing the bleeding even if the reaction liquid and the first ink are not completely dried. Before the second step, there may be a step of drying at least a portion of the reaction liquid and the first ink which are coated on the recording medium, and it is preferable to have a step of drying a portion thereof instead of completely drying thereof. In addition, during the second step or after the second step, there may be a step of drying the second ink which is coated on the recording medium.

The amount of the imparted second ink in the second step is preferably 2 mg/inch$^2$ to 20 mg/inch$^2$, and more preferably 5 mg/inch$^2$ to 15 mg/inch$^2$. By setting the imparted amount of the second ink to be within the above-described range, the obtained recorded matter tends to be excellent in the bleeding resistance, clogging reliability, and stickiness.

In the first step and the second step, the total amount of the color materials contained in the first ink and the second ink imparted to the recording medium is preferable 0.5 to 3 mg/inch$^2$, and more preferably 1 mg/inch$^2$ or more, and further preferably 1.5 mg/inch$^2$ or more, and further preferably 2.5 mg/inch$^2$ or less.

In the first step, the amount of the color material contained in the first ink imparted to the recording medium is preferable 0.1 to 2.5 mg/inch$^2$, and more preferably 0.2 mg/inch$^2$ or more, and further preferably 0.5 mg/inch$^2$ or more, and further preferably 1 mg/inch$^2$ or more, and further preferably 2 mg/inch$^2$ or less. These amounts are at area in the recording medium which the first ink and the second ink is imparted into contact with. By setting these imparted amounts to be within the above-described range, the obtained recorded matter tends to be excellent in the image quality and the value of later ratio E, F, G, H tends to be set in later ranges.

The amount of the color material is preferably at area in the recording medium which the first ink and the second ink is imparted into contact with, and the amount of the color material is most large.

The total amount of the color materials is preferably at area in the recording medium which the first ink and the second ink is imparted into contact with, and the amounts of the color materials are most large.

In these, the obtained recorded matter tends to be excellent in the image quality.

In the first step and the second step, it is possible to discharge the first ink or the second ink from nozzles of a line head or a serial head through an ink jet method to make the first ink or the second ink to adhere to the recording medium. In a line system using the line head, it is possible to record the image on the recording medium by fixing the head to move the recording medium along a sub scanning direction (a longitudinal direction or a transporting direction of the recording medium) and by discharging ink droplets from the nozzle opening of the head cooperatively with the movement. In addition, in a serial system using the serial head, it is possible to record the image on the recording medium by moving the head along a main scanning direction (a horizontal direction or a width direction of the recording medium) and by discharging ink droplets from the nozzle opening of the head cooperatively with the movement.

In the second step, the volatilization amount of a volatile component contained in the reaction liquid and the first ink which are imparted to the non-absorptive recording medium or the low-absorptive recording medium at the time of imparting the second ink with respect to a 100 total mass % of a volatile component contained in the reaction liquid and the first ink before the imparting is preferably less than or equal to 95 mass %, more preferably less than or equal to 85 mass %, and still more preferably less than or equal to 80 mass %. In addition, the volatilization amount thereof is still more preferably less than or equal to 60 mass %, still more preferably less than or equal to 50 mass %, and still more preferably less than or equal to 30 mass % in terms of obtaining more excellent recording speed while obtaining excellent clogging reliability. Meanwhile, the volatilization amount thereof is preferably greater than or equal to 5 mass %, more preferably greater than or equal to 10 mass %, particularly preferably 50 mass %, and still more preferably greater than or equal to 60 mass % in terms of achieving more excellent suppression of the bleeding. Here, the "reaction liquid before the imparting" refers to a reaction liquid before imparting the reaction liquid which is to be coated on the recording medium in the reaction liquid imparting step and the " . . . first ink before the imparting" refers to a first ink before imparting the first ink which is to be coated on the recording medium in the first step. By setting the volatilization amount of the volatile component to be less than or equal to 95 mass %, it is possible to effectively react the reaction liquid with the second ink, thereby achieving the high recording speed. The volatilization amount of the volatile component can be obtained through the method described in Examples.

The ratio E of the number of moles (unit: mol) of a coagulant contained in the reaction liquid per unit area in an area where the first ink and the second ink are imparted on the non-absorptive recording medium or the low-absorptive recording medium in a superimposed manner, to the total mass (unit: g) of a color material contained in the first ink and the second ink is preferably 800:1 to 31000:1, more preferably 800:1 to 16000:1, and still more preferably 1600:1 to 5100:1. By setting the ratio E to be greater than or equal to 800:1, it is possible to prevent precipitation of the reaction liquid, cloudiness due to the reaction liquid, stickiness, and the generation of a bad odor. By setting the rate E to be less than or equal to 31000:1, it is possible to suppress the bleeding when superimposing inks. The ratio E can be controlled by the imparting amount of the first ink, the second ink, and the reaction liquid.

The ratio F of the number of moles (unit: mol) of the polyvalent metal salt contained in the reaction liquid per unit area in the above-described area on the non-absorptive recording medium or the low-absorptive recording medium, to the total mass (unit: g) of the color material contained in the first ink and the second ink is preferably 1000:1 to 31000:1, more preferably 1000:1 to 15000:1, and still more preferably 1000:1 to 5100:1. By setting the ratio F to be greater than or equal to 1000:1, it is possible to prevent precipitation of the polyvalent metal salt, cloudiness due to the polyvalent metal salt, stickiness, and the generation of a bad odor. By setting the ratio F to be less than or equal to 31000:1, it is possible to suppress the bleeding when superimposing inks. The ratio F can be controlled by the imparting amount of the first ink, the second ink, and the reaction liquid.

The ratio G of the number of moles (unit: mol) of the organic acid contained in the reaction liquid per unit area in the above-described area on the non-absorptive recording medium or the low-absorptive recording medium, to the total mass (unit: g) of the color material contained in the first ink and the second ink is preferably 800:1 to 5500:1, more preferably 800:1 to 1700:1, and still more preferably 1000:1 to 1700:1. By setting the ratio G to be greater than or equal to 800:1, it is possible to prevent precipitation of the organic acid, cloudiness due to the organic acid, stickiness, and the generation of a bad odor. By setting the ratio G to be less than or equal to 5500:1, it is possible to suppress the bleeding when superimposing inks. The ratio G can be controlled by the imparting amount of the first ink, the second ink, and the reaction liquid.

The ratio H of the mass (unit: g) of at least one selected from the group consisting of the component of the receiving layer, and the cationic resin, which are contained in the reaction liquid per unit area of the above-described area on the non-absorptive recording medium or the low-absorptive recording medium, to the mass (unit: g) color material contained in the first ink is preferably 7:1 to 70:1, and more preferably 7:1 to 50:1. By setting the ratio H to be greater than or equal to 7:1 (the former), the suppression of the bleeding tends to be more excellent. By setting the ratio H to be less than or equal to 70:1 (the former), there is a tendency that it is excellent in efficiently imparting the reaction liquid. The ratio H can be controlled by the imparting amount of the first ink and the reaction liquid. As these are apparent from table 3 to 5, the ratio E is the ratio of (the color material: the coagulant), the ratio F is the ratio of (the color material: the polyvalent metal salt), the ratio G is the ratio of (the color material: the organic acid), the ratio H is the ratio of (the color material: at least one kind that is selected from group).

In the recording method according to the present embodiment, it is preferable that the temperature of the surface of the recording medium in the first step and the second step be 10° C. to 65° C. In addition, the temperature thereof is more preferably lower than or equal to 50° C., and still more preferably lower than or equal to 40° C. in terms of obtaining more excellent clogging reliability. Meanwhile, the temperature thereof is more preferably higher than or equal to 20° C., still more preferably higher than or equal to 40° C., and particularly preferably higher than or equal to 50° C. in terms of achieving more excellent recording speed. By setting the temperature of the surface of the recording medium to be within the above-described range, the clogging reliability and the recording speed tend to be particularly excellent.

EXAMPLES

Hereinafter, the invention will be described in detail using Examples and Comparative Examples. The present invention is not limited to the following Examples.
Materials for Reaction Liquid and Ink
Main materials for the reaction liquid and the ink used in the following Examples and Comparative Examples are as follows.
Pigment
Titanium dioxide: metal oxide, NanoTek(R) slurry manufactured by C.I. Kasei Co., Ltd.
Cyan pigment: C. I. Pigment Blue 15:3
Polyvalent Metal Salt
Magnesium sulfate heptahydrate (molecular weight 246.47 g/mol)
Calcium acetate monohydrate (molecular weight 176.18 g/mol)
Calcium nitrate tetrahydrate (molecular weight 164.09 g/mol)
Organic Acid
Succinic acid (molecular weight 118.09 g/mol)
Surfactant
BYK 348 (silicone surfactant, manufactured by BYK Japan KK)
Resin Emulsion
Joncryl 62J (acrylic styrene-based resin, manufactured by BASF Japan Ltd.)
Component of Receiving Layer
Anionic colloidal silica (manufactured by Nissan Chemical Industries, Ltd., "SNOWTEX ZL")
Cationic Resin
Cationic resin emulsion (manufactured by UNITIKA LTD., "Arobase CD-1200")
Organic Solvent
1,2-hexane diol
Moisturizing Agent
Propylene glycol
Preparation of Reaction Liquid and Ink
Each of the materials was mixed in compositions (mass %) shown in the following Table 1 and the mixture was sufficiently stirred to obtain a reaction liquid, a first ink, and a second ink.

TABLE 1

| | | Reaction liquid | | | | | | | | | | | | | | | | | Ink | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 1 | 2 |
| Polyvalent metal salt | Magnesium sulfate heptahydrate | 0.8 | 1.6 | 4.8 | 16 | 0 | 0 | 0 | 0 | 0 | 0 | 0 | 1.6 | 1.6 | 1.6 | 1.6 | 0 | 0 | 0 | 0 |
| | Calcium acetate monohydrate | 0 | 0 | 0 | 0 | 1.1 | 3.4 | 0 | 0 | 0 | 0 | 0 | 0 | 0 | 0 | 0 | 0 | 0 | 0 | 0 |
| | Calcium nitrate tetrahydrate | 0 | 0 | 0 | 0 | 0 | 0 | 1.5 | 4.6 | 0 | 0 | 0 | 0 | 0 | 0 | 0 | 0 | 0 | 0 | 0 |
| Organic acid | Succinic acid | 0 | 0 | 0 | 0 | 0 | 0 | 0 | 0 | 2.3 | 6.9 | 13.8 | 0 | 0 | 0 | 0 | 0 | 0 | 0 | 0 |
| Pigment | White pigment (titanium dioxide) | 0 | 0 | 0 | 0 | 0 | 0 | 0 | 0 | 0 | 0 | 0 | 0 | 0 | 0 | 0 | 0 | 0 | 10 | 0 |
| | Color pigment (cyan) | 0 | 0 | 0 | 0 | 0 | 0 | 0 | 0 | 0 | 0 | 0 | 0 | 0 | 0 | 0 | 0 | 0 | 0 | 4 |
| Surfactant | BYK 348 | 0.6 | 0.6 | 0.6 | 0.6 | 0.6 | 0.6 | 0.6 | 0.6 | 0.6 | 0.6 | 0.6 | 0.6 | 0.6 | 0.6 | 0.1 | 0.6 | 0.6 | 0.6 | 0.6 |
| Resin emulsion | Joncryl 62J | 0 | 0 | 0 | 0 | 0 | 0 | 0 | 0 | 0 | 0 | 0 | 0 | 0 | 0 | 0 | 0 | 0 | 4 | 2 |
| Component which becomes receiving layer | Anionic colloidal silica | 0 | 0 | 0 | 0 | 0 | 0 | 0 | 0 | 0 | 0 | 0 | 5 | 0.1 | 0 | 0 | 0 | 5 | 0 | 0 |
| Cationic resin | Cationic resin emulsion | 0 | 0 | 0 | 0 | 0 | 0 | 0 | 0 | 0 | 0 | 0 | 0 | 5 | 0 | 0 | 0 | 5 | 0 | 0 |
| Organic solvent | 1,2-hexane diol | 0 | 0 | 0 | 0 | 0 | 0 | 0 | 0 | 0 | 0 | 0 | 0 | 0 | 0 | 0 | 0 | 0 | 3 | 3 |
| Moisturizing Agent | Propylene glycol | 20 | 20 | 20 | 20 | 20 | 20 | 20 | 20 | 20 | 20 | 20 | 20 | 20 | 20 | 20 | 20 | 20 | 10 | 15 |
| | Water | Balance | Balance | Balance | Balance | Balance | Balance | Balance | Balance | Balance | Balance | Balance | Balance | Balance | Balance | Balance | Balance | Balance | Balance | Balance |
| Surface tension of reaction liquid (mN/m) | | 35 | 35 | 35 | 35 | 35 | 35 | 35 | 35 | 35 | 35 | 35 | 35 | 35 | 35 | 55 | 35 | 35 | — | — |

Method of Measuring Surface Tension

The surface tension of the reaction liquid was measured using a surface tensiometer (manufactured by Kyowa Interface Science Co., Ltd., surface tensiometer CBVP-Z or the like) through a Wilhelmy method at a solution temperature of 25° C.

Preparation of Ink Sets

Ink sets were obtained by combining the obtained reaction liquid, first ink, and second ink as in Table 2.

Volatilization Amount of Volatile Component of Reaction Liquid and First Ink Before Second Step The volatilization amount of the volatile component of the reaction liquid and the first ink in the pattern 3 after the first step and before the second step (when the recording medium was transported to the position facing the head for the second ink) was calculated using the following formula. Here, Af is a total imparting amount (mg) of the reaction liquid and the first ink of the area to which the reaction liquid

TABLE 2

|  | Examples | | | | | | | | | | | | | | | | | | | Comparative Examples | | | |
| --- | --- | --- | --- | --- | --- | --- | --- | --- | --- | --- | --- | --- | --- | --- | --- | --- | --- | --- | --- | --- | --- | --- |
|  | 1 | 2 | 3 | 4 | 5 | 6 | 7 | 8 | 9 | 10 | 11 | 12 | 13 | 14 | 15 | 16 | 17 | 18 | 19 | 1 | 2 | 3 | 4 |
| Reaction liquid No. | 1 | 2 | 3 | 4 | 5 | 6 | 7 | 8 | 9 | 10 | 11 | 12 | 13 | 14 | 14 | 14 | 14 | 9 | 15 | 16 | 16 | 17 | 16 |
| Ink No. of First ink | 1 | 1 | 1 | 1 | 1 | 1 | 1 | 1 | 1 | 1 | 1 | 1 | 1 | 1 | 1 | 1 | 2 | 1 | 1 | 1 | 1 | 1 | 1 |
| Ink No. of Second ink | 2 | 2 | 2 | 2 | 2 | 2 | 2 | 2 | 2 | 2 | 2 | 2 | 2 | 2 | 2 | 2 | 1 | 2 | 2 | 2 | 2 | 2 | 2 |
| Ratio A | 4313 | 2157 | 719 | 216 | 3137 | 1015 | 1532 | 499 | 719 | 240 | 1202 | 157 | 2157 | 2157 | 2157 | 2157 | 2157 | 719 | 2157 | — | — | — | — |
| Ratio B | 4313 | 2157 | 719 | 216 | 3137 | 1015 | 1532 | 499 | — | — | — | 2157 | 2157 | 2157 | 2157 | 2157 | 2157 | 719 | 2157 | — | — | — | — |
| Ratio C | — | — | — | — | — | — | — | — | 719 | 240 | 120 | — | — | — | — | — | — | — | — | — | — | — | — |
| Ratio D | — | — | — | — | — | — | — | — | — | — | — | 2.00 | 1.96 | — | — | — | — | — | — | — | — | — | — |

Examples 1 to 18, Comparative Examples 1 to 5

Converted equipment of PX-G930 (Seiko Epson Corp.) was used. The converted point is to install a heater to a platen so as to be able to heat a recording medium. A nozzle pitch is 180 dpi. The reaction liquid, the first ink, and the second ink of the ink set prepared in the above were discharged in this order from each head through the ink jet method under the recording conditions shown in Tables 1 to 3; and solid patterns were adhered to a PET film "Lumirror S10" (trade name, thickness of 100 μm) manufactured by TORAY INDUSTRIES, INC. as the non-absorptive recording medium or NP coating paper (manufactured by Lintec Corporation) as the low-absorptive recording medium. At this time, a pattern 1 to which only the reaction liquid was imparted, a pattern 2 to which only the reaction liquid and the first ink were imparted in a superimposed manner, and a pattern 3 to which the reaction liquid, the first ink, and the second ink were imparted in a superimposed manner were formed. The pattern 2 and the pattern 3 are simultaneously formed so as to come into contact with each other.

Specifically, in a case of forming the pattern 3, a reaction liquid was imparted while adjusting the temperature of the recording medium to be the temperatures in Tables 3 to 5 in advance to form a pattern (sub-pattern) constituting the reaction liquid; a first ink was subsequently imparted on the sub-pattern constituting the reaction liquid to form a sub-pattern consisting the first ink; and then, a sub-pattern constituting the second ink was formed on the sub-pattern constituting the first ink to form the pattern 3. The temperature of the recording medium was adjusted using the platen heater so as to maintain the temperature to be the temperatures in Tables 3 to 5 even while imparting the reaction liquid, the first ink, and the second ink. In addition, after the first step and before the start of the second step, the contents of the volatile components of the reaction liquid and the first ink on the recording medium were adjusted to be the values in Tables 3 to 5 to perform the second step. Recording resolution was set to 720×720 dpi and the amount of the reaction liquid and the amount of the ink per dot were adjusted to be the imparting amount in the tables.

and the first ink are imparted to the recording medium in a superimposed manner. In addition, Ae is a total amount of residue of the reaction liquid and the first ink on the recording medium in a state where the reaction liquid and the first ink were dried (volatilized) until the recorded matter becomes a state to be ready for use. Furthermore, A is a total mass of the reaction liquid and the first ink on the recording medium immediately before the second step.

Volatilization amount % of the volatile component=
$((Af-A)/(Af-Ae))\times 100$

Af can be obtained from discharge data of the printer and the mass per dot as the imparting amount of the reaction liquid and the first ink in the pattern 3. A can be obtained by measuring the mass of the recording medium when starting the imparting of the second ink and the mass of the recording medium before the step of the reaction liquid imparting step to take the difference therebetween. When measuring the volatilization amount of the volatile component, it is simple to use the recording medium which was prepared for the measurement. The measurement was performed using an electronic balance. When performing the measurement, the relationship between predetermined drying time and volatilization amount at the time of heating and drying the reaction liquid and the first ink using the platen after the reaction liquid and the first ink were imparted. When performing the recording using the recording apparatus, it is possible to set a predetermined volatilization amount by setting the time between the imparting of the reaction liquid and the first ink and the imparting of the second ink to be any time of the relationship between the drying time and the volatilization amount obtained as above.

Evaluation

Bleeding when Recording First Ink and Second Ink in Superimposed Manner

Recorded matters which were recorded by varying the imparting amount of the second ink in the pattern 3 between 30% and 200% were obtained by setting the value shown in Tables 3 to 5 as 100%. The portion where the pattern 3 and the pattern 2 of the obtained recorded matter come into contact with each other was visually observed to evaluate bleeding when recording the first ink and the second ink in a superimposed manner using the following evaluation criteria. "200%" is a value obtained by assuming a maximum imparting amount of the total of a plurality of colors of inks in a case where a secondary color or more are recorded using a plurality of color inks. It can be said that a recorded matter in which the bleeding is suppressed is obtained when using the plurality of color inks if the score in the following evaluation criteria is A or AA.
Evaluation Criteria
AA: There is no color mixing even if the imparting amount of the second ink is 200%.
A: There is no color mixing if the imparting amount of the second ink is up to 100%.
B: There is no color mixing if the imparting amount of the second ink is up to 50%.
C: There is color mixing occurring even if the imparting amount of the second ink is 30%.
Precipitation of Reaction Liquid on Recording Medium
The pattern 1 was visually observed to evaluate the precipitation of the reaction liquid on the recording method using the following evaluation criteria.
Evaluation Criteria
A: The precipitation is not recognized.
B: The precipitation is recognized, but the cloudiness is not recognized.
C: The precipitation and the cloudiness are recognized.
Cloudiness of Image Portion
The pattern 3 was visually observed by evaluating the cloudiness of the portion (image portion) to which an ink was imparted using the following evaluation criteria.
Evaluation Criteria
A: The cloudiness is not recognized.
B: The cloudiness is recognized.
Unevenness of First Ink on Recording Medium
The pattern 2 was visually observed to evaluate the unevenness of the first ink on the recording medium using the following Evaluation Criteria.
Evaluation Criteria
A: Cohesion unevenness is not recognized in the first ink.
B: Slight cohesion unevenness is recognized in the first ink.
C: Considerable cohesion unevenness is recognized in the first ink.
Bad Odor of Recorded Matter
Sensory evaluation was performed on the pattern 3 to evaluate the bad odor of the recorded matter using the following evaluation criteria.

Evaluation Criteria
A: There is no bad odor.
B: There is a slight bad odor.
C: There is a considerable bad odor.
Stickiness of Recorded Matter
The patterns 3 between recorded surfaces were superimposed to evaluate the stickiness of the recorded matter using the following evaluation criteria.
Evaluation Criteria
A: There is no adherence between two printed surfaces even if they are left to stand for 1 day in a state of being superimposed (there is no stickiness).
B: After the two printed surfaces are left to stand for 1 day in the state of being superimposed, the two printed surfaces are adhered to each other if one surface is lifted, but they are peeled off within 1 minute (there is slight stickiness).
C: After the two printed surfaces are left to stand for 1 day in the state of being superimposed, the two printed surfaces are adhered to each other if one surface is lifted, and they are not peeled off even after 1 minute (there is stickiness).
Recording Speed
The recording speed was evaluated based on the recording speed at which the pattern 3 can be obtained, using the following evaluation criteria.
Evaluation Criteria
A: The pattern 3 can be recorded on an A4-size recording medium in less than 30 seconds.
B: The pattern 3 can be recorded on an A4-size recording medium in 30 seconds to 1 minute.
C: The pattern 3 can be recorded on an A4-size recording medium if the time exceeds 3 minutes.
Clogging Reliability
A nozzle after the pattern 3 was recorded on 50 sheets of A4-sized recording media were visually observed to evaluate the clogging reliability using the following evaluation criteria.
Evaluation Criteria
A: Neither nozzle slip-out nor bent nozzle occurs even if the pattern 3 is recorded on 50 sheets of the recording media.
B: The nozzle slip-out is not occurred, but the bent nozzle occurs if the pattern 3 is recorded on 50 sheets of the recording media.
C: The nozzle slip-out and the bent nozzle occur if to pattern 3 is recorded on 50 sheets of the recording media.

TABLE 3

| | Example 1 | | | Example 2 | | | Example 3 | | | Example 4 | | |
|---|---|---|---|---|---|---|---|---|---|---|---|---|
| Ink | Reaction liquid | First ink (white) | Second ink (color) | Reaction liquid | First ink (white) | Second ink (color) | Reaction liquid | First ink (white) | Second ink (color) | Reaction liquid | First ink (white) | Second ink (color) |
| Magnesium sulfate heptahydrate | 0.8 | 0 | 0 | 1.6 | 0 | 0 | 4.8 | 0 | 0 | 16 | 0 | 0 |
| Calcium acetate monohydrate | 0 | 0 | 0 | 0 | 0 | 0 | 0 | 0 | 0 | 0 | 0 | 0 |
| Calcium nitrate tetrahydrate | 0 | 0 | 0 | 0 | 0 | 0 | 0 | 0 | 0 | 0 | 0 | 0 |
| Succinic acid | 0 | 0 | 0 | 0 | 0 | 0 | 0 | 0 | 0 | 0 | 0 | 0 |
| White pigment (titanium oxide) | 0 | 10 | 0 | 0 | 10 | 0 | 0 | 10 | 0 | 0 | 10 | 0 |
| Color pigment (cyan) | 0 | 0 | 4 | 0 | 0 | 4 | 0 | 0 | 4 | 0 | 0 | 4 |
| Surfactant | 0.6 | 0.6 | 0.6 | 0.6 | 0.6 | 0.6 | 0.6 | 0.6 | 0.6 | 0.6 | 0.6 | 0.6 |
| Joncryl 62J | 0 | 4 | 2 | 0 | 4 | 2 | 0 | 4 | 2 | 0 | 4 | 2 |
| Anionic colloidal silica | 0 | 0 | 0 | 0 | 0 | 0 | 0 | 0 | 0 | 0 | 0 | 0 |
| Cationic resin emulsion | 0 | 0 | 0 | 0 | 0 | 0 | 0 | 0 | 0 | 0 | 0 | 0 |
| 1,2-hexane diol | 0 | 3 | 3 | 0 | 3 | 3 | 0 | 3 | 3 | 0 | 3 | 3 |
| Propylene glycol | 20 | 10 | 15 | 20 | 10 | 15 | 20 | 10 | 15 | 20 | 10 | 15 |
| Water | Balance | Balance | Balance | Balance | Balance | Balance | Balance | Balance | Balance | Balance | Balance | Balance |
| Recording medium | Lumirror S10 | | | Lumirror S10 | | | Lumirror S10 | | | Lumirror S10 | | |

TABLE 3-continued

| | | | | | | | | | | | |
|---|---|---|---|---|---|---|---|---|---|---|---|
| Surface temperature of recording medium during recording (heat assist) | Room temperature (25° C.) | | | Room temperature (25° C.) | | | Room temperature (25° C.) | | | Room temperature (25° C.) | | |
| Volatilization amount of volatile component in second step | 10% | | | 10% | | | 10% | | | 10% | | |
| Imparting amount (mg/inch$^2$) | 2 | 14 | 14 | 2 | 14 | 14 | 2 | 14 | 14 | 2 | 14 | 14 |
| Imparting amount of color material (mg/inch$^2$) | 0 | 1.4 | 0.56 | 0 | 1.4 | 0.56 | 0 | 1.4 | 0.56 | 0 | 1.4 | 0.56 |
| Imparting amount of coagulant ($\times 10^{-4}$ mmol/inch$^2$) | 0.65 | 0 | 0 | 1.3 | 0 | 0 | 3.9 | 0 | 0 | 13 | 0 | 0 |
| Total imparting amount of component which becomes receiving layer and cationic resin (mg/inch$^2$) | 0 | 0 | 0 | 0 | 0 | 0 | 0 | 0 | 0 | 0 | 0 | 0 |
| Ratio F | 30154:1 | | | 15077:1 | | | 5026:1 | | | 1508:1 | | |
| Ratio G | — | | | — | | | — | | | — | | |
| Ratio H | — | | | — | | | — | | | — | | |
| Unevenness of first ink on recording medium | B | | | A | | | A | | | A | | |
| Bleeding when recording first ink and second ink in superimposed manner | B | | | A | | | AA | | | AA | | |
| Precipitation of reaction liquid on recording medium | A | | | A | | | A | | | B | | |
| Cloudiness of recorded matter | A | | | A | | | A | | | B | | |
| Bad odor of recorded matter | A | | | A | | | A | | | A | | |
| Stickiness of recorded matter | A | | | A | | | A | | | A | | |
| Recording speed | A | | | A | | | A | | | A | | |
| Clogging reliability | A | | | A | | | A | | | A | | |

| | Example 5 | | | Example 6 | | | Example 7 | | | Example 8 | | |
|---|---|---|---|---|---|---|---|---|---|---|---|---|
| Ink | Reaction liquid | First ink (white) | Second ink (color) | Reaction liquid | First ink (white) | Second ink (color) | Reaction liquid | First ink (white) | Second ink (color) | Reaction liquid | First ink (white) | Second ink (color) |
| Magnesium sulfate heptahydrate | 0 | 0 | 0 | 0 | 0 | 0 | 0 | 0 | 0 | 0 | 0 | 0 |
| Calcium acetate monohydrate | 1.1 | 0 | 0 | 3.4 | 0 | 0 | 0 | 0 | 0 | 0 | 0 | 0 |
| Calcium nitrate tetrahydrate | 0 | 0 | 0 | 0 | 0 | 0 | 1.5 | 0 | 0 | 4.6 | 0 | 0 |
| Succinic acid | 0 | 0 | 0 | 0 | 0 | 0 | 0 | 0 | 0 | 0 | 0 | 0 |
| White pigment (titanium oxide) | 0 | 10 | 0 | 0 | 10 | 0 | 0 | 10 | 0 | 0 | 10 | 0 |
| Color pigment (cyan) | 0 | 0 | 4 | 0 | 0 | 4 | 0 | 0 | 4 | 0 | 0 | 4 |
| Surfactant | 0.6 | 0.6 | 0.6 | 0.6 | 0.6 | 0.6 | 0.6 | 0.6 | 0.6 | 0.6 | 0.6 | 0.6 |
| Joncryl 62J | 0 | 4 | 2 | 0 | 4 | 2 | 0 | 4 | 2 | 0 | 4 | 2 |
| Anionic colloidal silica | 0 | 0 | 0 | 0 | 0 | 0 | 0 | 0 | 0 | 0 | 0 | 0 |
| Cationic resin emulsion | 0 | 0 | 0 | 0 | 0 | 0 | 0 | 0 | 0 | 0 | 0 | 0 |
| 1,2-hexane diol | 0 | 3 | 3 | 0 | 3 | 3 | 0 | 3 | 3 | 0 | 3 | 3 |
| Propylene glycol | 20 | 10 | 15 | 20 | 10 | 15 | 20 | 10 | 15 | 20 | 10 | 15 |
| Water | Balance | Balance | Balance | Balance | Balance | Balance | Balance | Balance | Balance | Balance | Balance | Balance |
| Recording medium | | Lumirror S10 | | | Lumirror S10 | | | Lumirror S10 | | | Lumirror S10 | |
| Surface temperature of recording medium during recording (heat assist) | Room temperature (25° C.) | | | Room temperature (25° C.) | | | Room temperature (25° C.) | | | Room temperature (25° C.) | | |
| Volatilization amount of volatile component in second step | 10% | | | 10% | | | 10% | | | 10% | | |
| Imparting amount (mg/inch$^2$) | 2 | 14 | 14 | 2 | 14 | 14 | 2 | 14 | 14 | 2 | 14 | 14 |
| Imparting amount of color material (mg/inch$^2$) | 0 | 1.4 | 0.56 | 0 | 1.4 | 0.56 | 0 | 1.4 | 0.56 | 0 | 1.4 | 0.56 |
| Imparting amount of coagulant ($\times 10^{-4}$ mmol/inch$^2$) | 1.3 | 0 | 0 | 3.9 | 0 | 0 | 1.3 | 0 | 0 | 3.9 | 0 | 0 |
| Total imparting amount of component which becomes receiving layer and cationic resin (mg/inch$^2$) | 0 | 0 | 0 | 0 | 0 | 0 | 0 | 0 | 0 | 0 | 0 | 0 |
| Ratio F | 15077:1 | | | 5026:1 | | | 15077:1 | | | 5026:1 | | |
| Ratio G | — | | | — | | | — | | | — | | |
| Ratio H | — | | | — | | | — | | | — | | |
| Unevenness of first ink on recording medium | A | | | A | | | A | | | A | | |
| Bleeding when recording first ink and second ink in superimposed manner | A | | | AA | | | A | | | AA | | |

TABLE 3-continued

| | | | | |
|---|---|---|---|---|
| Precipitation of reaction liquid on recording medium | A | A | A | A |
| Cloudiness of recorded matter | A | A | A | A |
| Bad odor of recorded matter | A | B | A | A |
| Stickiness of recorded matter | A | A | A | B |
| Recording speed | A | A | A | A |
| Clogging reliability | A | A | A | A |

TABLE 4

| | Example 9 | | | Example 10 | | | Example 11 | | | Example 12 | | |
|---|---|---|---|---|---|---|---|---|---|---|---|---|
| Ink | Reaction liquid | First ink (white) | Second ink (color) | Reaction liquid | First ink (white) | Second ink (color) | Reaction liquid | First ink (white) | Second ink (color) | Reaction liquid | First ink (white) | Second ink (color) |
| Magnesium sulfate heptahydrate | 0 | 0 | 0 | 0 | 0 | 0 | 0 | 0 | 0 | 1.6 | 0 | 0 |
| Calcium acetate monohydrate | 0 | 0 | 0 | 0 | 0 | 0 | 0 | 0 | 0 | 0 | 0 | 0 |
| Calcium nitrate tetrahydrate | 0 | 0 | 0 | 0 | 0 | 0 | 0 | 0 | 0 | 0 | 0 | 0 |
| Succinic acid | 2.3 | 0 | 0 | 6.9 | 0 | 0 | 13.8 | 0 | 0 | 0 | 0 | 0 |
| White pigment (titanium oxide) | 0 | 10 | 0 | 0 | 10 | 0 | 0 | 10 | 0 | 0 | 10 | 0 |
| Color pigment (cyan) | 0 | 0 | 4 | 0 | 0 | 4 | 0 | 0 | 4 | 0 | 0 | 4 |
| Surfactant | 0.6 | 0.6 | 0.6 | 0.6 | 0.6 | 0.6 | 0.6 | 0.6 | 0.6 | 0.6 | 0.6 | 0.6 |
| Styrene acrilic resin | 0 | 4 | 2 | 0 | 4 | 2 | 0 | 4 | 2 | 0 | 4 | 2 |
| Component which becomes receiving layer | 0 | 0 | 0 | 0 | 0 | 0 | 0 | 0 | 0 | 5 | 0 | 0 |
| Cationic resin | 0 | 0 | 0 | 0 | 0 | 0 | 0 | 0 | 0 | 0 | 0 | 0 |
| 1,2-hexane diol | 0 | 3 | 3 | 0 | 3 | 3 | 0 | 3 | 3 | 0 | 3 | 3 |
| Propylene glycol | 20 | 10 | 15 | 20 | 10 | 15 | 20 | 10 | 15 | 20 | 10 | 15 |
| Water | Balance | Balance | Balance | Balance | Balance | Balance | Balance | Balance | Balance | Balance | Balance | Balance |
| Recording medium | Lumirror S10 | | | Lumirror S10 | | | Lumirror S10 | | | Lumirror S10 | | |
| Surface temperature of recording medium during recording (heat assist) | Room temperature (25° C.) | | | Room temperature (25° C.) | | | Room temperature (25° C.) | | | Room temperature (25° C.) | | |
| Volatilization amount of volatile component in second step | | 10% | | | 10% | | | 10% | | | 10% | |
| Imparting amount (mg/inch$^2$) | 2 | 14 | 14 | 2 | 14 | 14 | 2 | 14 | 14 | 2 | 14 | 14 |
| Imparting amount of color material (mg/inch$^2$) | 0 | 1.4 | 0.56 | 0 | 1.4 | 0.56 | 0 | 1.4 | 0.56 | 0 | 1.4 | 0.56 |
| Imparting amount of coagulant ($\times 10^{-4}$ mmol/inch$^2$) | 3.9 | 0 | 0 | 10.8 | 0 | 0 | 21.6 | 0 | 0 | 1.3 | 0 | 0 |
| Total imparting amount of component which becomes receiving layer and cationic resin (mg/inch$^2$) | 0 | 0 | 0 | 0 | 0 | 0 | 0 | 0 | 0 | 0.1 | 0 | 0 |
| Ratio F | — | | | — | | | — | | | 15077:1 | | |
| Ratio G | 5026:1 | | | 1675:1 | | | 837:1 | | | — | | |
| Ratio H | — | | | — | | | — | | | 14:1 | | |
| Unevenness of first ink on recording medium | A | | | A | | | A | | | A | | |
| Bleeding when recording first ink and second ink in superimposed manner | B | | | A | | | AA | | | AA | | |
| Precipitation of reaction liquid on recording medium | A | | | A | | | A | | | A | | |
| Cloudiness of recorded matter | A | | | A | | | A | | | A | | |
| Bad odor of recorded matter | A | | | A | | | A | | | A | | |
| Stickiness of recorded matter | A | | | A | | | A | | | A | | |
| Recording speed | A | | | A | | | A | | | A | | |
| Clogging reliability | A | | | A | | | A | | | A | | |

TABLE 4-continued

|  | Example 13 | | | Example 14 | | | Example 15 | | | Example 16 | | |
|---|---|---|---|---|---|---|---|---|---|---|---|---|
| Ink | Reaction liquid | First ink (white) | Second ink (color) | Reaction liquid | First ink (white) | Second ink (color) | Reaction liquid | First ink (white) | Second ink (color) | Reaction liquid | First ink (white) | Second ink (color) |
| Magnesium sulfate heptahydrate | 1.6 | 0 | 0 | 1.6 | 0 | 0 | 1.6 | 0 | 0 | 1.6 | 0 | 0 |
| Calcium acetate monohydrate | 0 | 0 | 0 | 0 | 0 | 0 | 0 | 0 | 0 | 0 | 0 | 0 |
| Calcium nitrate tetrahydrate | 0 | 0 | 0 | 0 | 0 | 0 | 0 | 0 | 0 | 0 | 0 | 0 |
| Succinic acid | 0 | 0 | 0 | 0 | 0 | 0 | 0 | 0 | 0 | 0 | 0 | 0 |
| White pigment (titanium oxide) | 0 | 10 | 0 | 0 | 10 | 0 | 0 | 10 | 0 | 0 | 10 | 0 |
| Color pigment (cyan) | 0 | 0 | 4 | 0 | 0 | 4 | 0 | 0 | 4 | 0 | 0 | 4 |
| Surfactant | 0.6 | 0.6 | 0.6 | 0.6 | 0.6 | 0.6 | 0.6 | 0.6 | 0.6 | 0.6 | 0.6 | 0.6 |
| Styrene acrilic resin | 0 | 4 | 2 | 0 | 4 | 2 | 0 | 4 | 2 | 0 | 4 | 2 |
| Component which becomes receiving layer | 0.1 | 0 | 0 | 0 | 0 | 0 | 0 | 0 | 0 | 0 | 0 | 0 |
| Cationic resin | 5 | 0 | 0 | 0 | 0 | 0 | 0 | 0 | 0 | 0 | 0 | 0 |
| 1,2-hexane diol | 0 | 3 | 3 | 0 | 3 | 3 | 0 | 3 | 3 | 0 | 3 | 3 |
| Propylene glycol | 20 | 10 | 15 | 20 | 10 | 15 | 20 | 10 | 15 | 20 | 10 | 15 |
| Water | Balance | Balance | Balance | Balance | Balance | Balance | Balance | Balance | Balance | Balance | Balance | Balance |
| Recording medium | Lumirror S10 | | | Lumirror S10 | | | Lumirror S10 | | | Lumirror S10 | | |
| Surface temperature of recording medium during recording (heat assist) | Room temperature (25° C.) | | | 45° C. | | | Room temperature (25° C.) | | | Room temperature (25° C.) | | |
| Volatilization amount of volatile component in second step | 10% | | | 80% | | | 80% | | | 95% | | |
| Imparting amount (mg/inch$^2$) | 2 | 14 | 14 | 2 | 14 | 14 | 2 | 14 | 14 | 2 | 14 | 14 |
| Imparting amount of color material (mg/inch$^2$) | 0 | 1.4 | 0.56 | 0 | 1.4 | 0.56 | 0 | 1.4 | 0.56 | 0 | 1.4 | 0.56 |
| Imparting amount of coagulant ($\times 10^{-4}$ mmol/inch$^2$) | 1.3 | 0 | 0 | 1.3 | 0 | 0 | 1.3 | 0 | 0 | 1.3 | 0 | 0 |
| Total imparting amount of component which becomes receiving layer and cationic resin (mg/inch$^2$) | 0.102 | 0 | 0 | 0 | 0 | 0 | 0 | 0 | 0 | 0 | 0 | 0 |
| Ratio F | 15077:1 | | | 15077:1 | | | 15077:1 | | | 15077:1 | | |
| Ratio G | — | | | — | | | — | | | — | | |
| Ratio H | 13.7:1 | | | — | | | — | | | — | | |
| Unevenness of first ink on recording medium | A | | | A | | | A | | | A | | |
| Bleeding when recording first ink and second ink in superimposed manner | AA | | | AA | | | A | | | B | | |
| Precipitation of reaction liquid on recording medium | A | | | A | | | A | | | A | | |
| Cloudiness of recorded matter | A | | | A | | | A | | | A | | |
| Bad odor of recorded matter | A | | | A | | | A | | | A | | |
| Stickiness of recorded matter | A | | | A | | | A | | | A | | |
| Recording speed | A | | | A | | | B | | | C | | |
| Clogging reliability | A | | | B | | | A | | | A | | |

TABLE 5

|  | Example 17 | | | Example 18 | | | Example 19 | | | Comparative Example 1 | | |
|---|---|---|---|---|---|---|---|---|---|---|---|---|
| Ink | Reaction liquid | First ink (white) | Second ink (color) | Reaction liquid | First ink (white) | Second ink (color) | Reaction liquid | First ink (white) | Second ink (color) | Reaction liquid | First ink (white) | Second ink (color) |
| Magnesium sulfate heptahydrate | 1.6 | 0 | 0 | 0 | 0 | 0 | 1.6 | 0 | 0 | 0 | 0 | 0 |
| Calcium acetate monohydrate | 0 | 0 | 0 | 0 | 0 | 0 | 0 | 0 | 0 | 0 | 0 | 0 |

TABLE 5-continued

| | | | | | | | | | | | | |
|---|---|---|---|---|---|---|---|---|---|---|---|---|
| Calcium nitrate tetrahydrate | 0 | 0 | 0 | 0 | 0 | 0 | 0 | 0 | 0 | 0 | 0 | 0 |
| Succinic acid | 0 | 0 | 0 | 2.3 | 0 | 0 | 0 | 0 | 0 | 0 | 0 | 0 |
| White pigment (titanium oxide) | 0 | 0 | 10 | 0 | 10 | 0 | 0 | 10 | 0 | 0 | 10 | 0 |
| Color pigment (cyan) | 0 | 4 | 0 | 0 | 0 | 4 | 0 | 0 | 4 | 0 | 0 | 4 |
| Surfactant | 0.6 | 0.6 | 0.6 | 0.6 | 0.6 | 0.6 | 0.1 | 0.6 | 0.6 | 0.6 | 0.6 | 0.6 |
| Styrene acrilic resin | 0 | 2 | 4 | 0 | 4 | 2 | 0 | 4 | 2 | 0 | 4 | 2 |
| Component which becomes receiving layer | 0 | 0 | 0 | 0 | 0 | 0 | 0 | 0 | 0 | 0 | 0 | 0 |
| Cationic resin | 0 | 0 | 0 | 0 | 0 | 0 | 0 | 0 | 0 | 0 | 0 | 0 |
| 1,2-hexane diol | 0 | 3 | 3 | 0 | 3 | 3 | 0 | 3 | 3 | 0 | 3 | 3 |
| Propylene glycol | 20 | 10 | 15 | 20 | 10 | 15 | 20 | 10 | 15 | 20 | 10 | 15 |
| Water | Balance | Balance | Balance | Balance | Balance | Balance | Balance | Balance | Balance | Balance | Balance | Balance |
| Recording medium | | Lumirror S10 | | | NP coating paper | | | Lumirror S10 | | | Lumirror S10 | |
| Surface temperature of recording medium during recording (heat assist) | | Room temperature (25° C.) | | | Room temperature (25° C.) | | | Room temperature (25° C.) | | | Room temperature (25° C.) | |
| Volatilization amount of volatile component in second step | | 10% | | | 10% | | | 10% | | | 10% | |
| Imparting amount (mg/inch$^2$) | 2 | 14 | 14 | 2 | 14 | 14 | 2 | 14 | 14 | 2 | 14 | 14 |
| Imparting amount of color material (mg/inch$^2$) | 0 | 0.56 | 1.4 | 0 | 1.4 | 0.56 | 0 | 1.4 | 0.56 | 0 | 1.4 | 0.56 |
| Imparting amount of coagulant ($\times 10^{-4}$ mmol/inch$^2$) | 1.3 | 0 | 0 | 3.9 | 0 | 0 | 1.3 | 0 | 0 | 0 | 0 | 0 |
| Total imparting amount of component which becomes receiving layer and cationic resin (mg/inch$^2$) | 0 | 0 | 0 | 0 | 0 | 0 | 0 | 0 | 0 | 0 | 0 | 0 |
| Ratio F | | 15077:1 | | | — | | | 15077:1 | | | — | |
| Ratio G | | — | | | 5026:1 | | | — | | | — | |
| Ratio H | | — | | | — | | | — | | | — | |
| Unevenness of first ink on recording medium | | A | | | A | | | B | | | C | |
| Bleeding when recording first ink and second ink in superimposed manner | | AA | | | A | | | B | | | C | |
| Precipitation of reaction liquid on recording medium | | A | | | A | | | C | | | A | |
| Cloudiness of recorded matter | | A | | | A | | | B | | | A | |
| Bad odor of recorded matter | | A | | | A | | | A | | | A | |
| Stickiness of recorded matter | | A | | | A | | | A | | | A | |
| Recording speed | | A | | | A | | | A | | | A | |
| Clogging reliability | | A | | | A | | | A | | | A | |

| | | Comparative Example 2 | | | Comparative Example 3 | | | Comparative Example 4 | | |
|---|---|---|---|---|---|---|---|---|---|---|
| | Ink | Reaction liquid | First ink (white) | Second ink (color) | Reaction liquid | First ink (white) | Second ink (color) | Reaction liquid | First ink (white) | Second ink (color) |
| Magnesium sulfate heptahydrate | | 0 | 0 | 0 | 0 | 0 | 0 | 0 | 0 | 0 |
| Calcium acetate monohydrate | | 0 | 0 | 0 | 0 | 0 | 0 | 0 | 0 | 0 |
| Calcium nitrate tetrahydrate | | 0 | 0 | 0 | 0 | 0 | 0 | 0 | 0 | 0 |
| Succinic acid | | 0 | 0 | 0 | 0 | 0 | 0 | 0 | 0 | 0 |
| White pigment (titanium oxide) | | 0 | 10 | 0 | 0 | 10 | 0 | 0 | 10 | 0 |
| Color pigment (cyan) | | 0 | 0 | 4 | 0 | 0 | 4 | 0 | 0 | 4 |
| Surfactant | | 0.6 | 0.6 | 0.6 | 0.6 | 0.6 | 0.6 | 0.6 | 0.6 | 0.6 |
| Styrene acrilic resin | | 0 | 4 | 2 | 0 | 4 | 2 | 0 | 4 | 2 |
| Component which becomes receiving layer | | 0 | 0 | 0 | 5 | 0 | 0 | 0 | 0 | 0 |
| Cationic resin | | 0 | 0 | 0 | 5 | 0 | 0 | 0 | 0 | 0 |
| 1,2-hexane diol | | 0 | 3 | 3 | 0 | 3 | 3 | 0 | 3 | 3 |
| Propylene glycol | | 20 | 10 | 15 | 20 | 10 | 15 | 20 | 10 | 15 |
| Water | | Balance | Balance | Balance | Balance | Balance | Balance | Balance | Balance | Balance |

TABLE 5-continued

| | | Lumirror S10 45° C. | | | Lumirror S10 Room temperature (25° C.) | | | Lumirror S10 70° C. | |
|---|---|---|---|---|---|---|---|---|---|
| Recording medium Surface temperature of recording medium during recording (heat assist) | | | | | | | | | |
| Volatilization amount of volatile component in second step | | 80% | | | 10% | | | 95% | |
| Imparting amount (mg/inch$^2$) | 2 | 14 | 14 | 2 | 14 | 14 | 2 | 14 | 14 |
| Imparting amount of color material (mg/inch$^2$) | 0 | 1.4 | 0.56 | 0 | 1.4 | 0.56 | 0 | 1.4 | 0.56 |
| Imparting amount of coagulant ($\times 10^{-4}$ mmol/inch$^2$) | 0 | 0 | 0 | 0 | 0 | 0 | 0 | 0 | 0 |
| Total imparting amount of component which becomes receiving layer and cationic resin (mg/inch$^2$) | 0 | 0 | 0 | 0.2 | 0 | 0 | 0 | 0 | 0 |
| Ratio F | | — | | | — | | | — | |
| Ratio G | | — | | | — | | | — | |
| Ratio H | | — | | | 7:1 | | | — | |
| Unevenness of first ink on recording medium | | C | | | C | | | A | |
| Bleeding when recording first ink and second ink in superimposed manner | | C | | | C | | | B | |
| Precipitation of reaction liquid on recording medium | | A | | | A | | | A | |
| Cloudiness of recorded matter | | A | | | A | | | A | |
| Bad odor of recorded matter | | A | | | A | | | A | |
| Stickiness of recorded matter | | A | | | A | | | A | |
| Recording speed | | A | | | A | | | B | |
| Clogging reliability | | B | | | A | | | C | |

By comparing Examples and Comparative Examples 1 to 3, it was found that the ink sets in which the reaction liquid does not contain the coagulant are inferior to the effect of suppressing the bleeding of the second ink. In addition, by comparing Examples and Comparative Example 4, it was found that when the reaction liquid does not contain the coagulant, while the effect of suppressing the bleeding of the second ink was improved by heating the recording medium to a temperature of 70° C., the clogging reliability deteriorated.

It was found that the amount of the polyvalent metal salt used was increased and the bleeding was suppressed from Examples 1 to 4. In addition, it was found that the precipitation of the reaction liquid or the cloudiness of the recorded matter on the recording medium were suppressed as the amount of the polyvalent metal salt used is small. In addition, Examples 5 to 11 show that there is a similar tendency even when using other polyvalent metal salts or organic acids.

Furthermore, from Examples 12 and 13, it was found that the bleeding was further suppressed using the component which becomes the receiving layer, and the cationic resin. In addition, by comparing Example 14 and other Examples, and Comparative Examples 2 and 4, it was found that the lower the heat assist temperature is, the more excellent the clogging reliability is. In addition, from Examples 2 and 14 to 16, it was found that the bleeding was suppressed if the volatilization amount is not too large while there was a tendency that the bleeding was suppressed if the volatilization amount of the volatile component is large. It is inferred that when the volatilization amount is too large, the coagulant contained in the reaction liquid cannot be sufficiently mixed on the first ink and it is difficult to react the second ink and the coagulant. In addition, it was found that the lower the volatilization amount is, the more excellent the recording speed and the clogging reliability are.

Example 17 shows that the invention was effective even if the white and the color of the first ink and the second ink were converted to each other. In addition, Examples 9 and 18 show that the invention was effective even if other recording media were used. It was found that the bleeding tends to be further improved when using the low-absorptive recording medium, but in contrast, the invention is more effective when using the non-absorptive recording medium since it is more excellent in the water resistance and the friction resistance. Furthermore, by comparing Example 19 and other Examples, it was found that as the content of the surfactant of the reaction liquid was large and the surface tension was low, the bleeding, the precipitation of the reaction liquid on the recording medium, or the cloudiness of the recorded matter was suppressed.

Although the recording was performed using the serial printer in the above-described example, it is also possible to perform the recording using the line printer as shown in FIGURE. In this case, it is possible to suppress the volatilization amount of the recording medium by adjusting the time between the imparting of the reaction liquid and the first ink through a reaction liquid imparting head and a first ink imparting head and the imparting of the second ink after the recording medium is transported to the position facing a second ink head, using the speed of transporting the recording medium, or the like.

The entire disclosures of Japanese Patent Application Nos. 2013-171444, filed Aug. 21, 2013 and 2013-182504, filed Sep. 3, 2013 and 2014-109749, filed May 28, 2014 are expressly incorporated by reference herein.

What is claimed is:

1. An ink set comprising:
a reaction liquid containing coagulant and a cationic resin emulsion;
a first ink containing a first color material; and
a second ink containing a second color material,
wherein the ink set is used for recording on a non-absorptive recording medium or a low-absorptive recording medium and for imparting the reaction liquid, the first ink, and the second ink to the recording medium in a superimposed manner in this order, and
wherein a ratio of the number of moles (unit: mol) of the coagulant contained in the reaction liquid to the total mass (unit: g) of the first and second color materials contained in the first ink and the second ink is 100:1 to 5000:1, and
wherein the first ink and the second ink each contain a resin emulsion.

2. The ink set according to claim 1,
wherein at least any one of the first ink and the second ink is a color ink containing a color material or a black ink containing a black color material.

3. The ink set according to claim 2,
wherein the other one of the first ink and the second ink is a white ink containing a white color material or a metallic ink containing a metallic color material.

4. The ink set according to claim 1,
wherein the coagulant contains at least one selected from a group consisting of a polyvalent metal salt and an organic acid.

5. The ink set according to claim 4,
wherein a ratio of the number of moles (unit: mol) of the polyvalent metal salt contained in the reaction liquid to the total mass (unit: g) of the color material contained in the first ink and the second ink is 1000:1 to 31000:1.

6. The ink set according to claim 4,
wherein a ratio of the number of moles (unit: mol) of the organic acid contained in the reaction liquid to the total mass (unit: g) of the color material contained in the first ink and the second ink is 800:1 to 5500:1.

7. The ink set according to claim 1,
wherein the first ink is a white ink containing a white color material or a metallic ink containing a metallic color material, and
wherein the second ink is a color ink containing the second color material or a black ink containing a black color material.

8. The ink set according to claim 1,
wherein a surface tension of the reaction liquid is less than or equal to 55 mN/m at a temperature of 25° C.

9. The ink set according to claim 1,
wherein the reaction liquid further contains at least one selected from a group consisting of a component which becomes a receiving layer of an ink applied after the reaction liquid, and a cationic resin.

10. The ink set according to claim 9,
wherein a mass ratio of at least one (unit: g) selected from the group consisting of the component which becomes the receiving layer, and the cationic resin, which are contained in the reaction liquid, to the color material (unit: g) contained in the first ink is 7:1 to 70:1.

11. A recording method using the ink set according to claim 1, the method comprising:

imparting the reaction liquid contained in the ink set to the non-absorptive recording medium or the low-absorptive recording medium;
imparting the first ink contained in the ink set to the area to which the reaction liquid is imparted; and
imparting the second ink contained in the ink set to the area to which the first ink is imparted.

12. A recording method using the ink set according to claim 2, the method comprising:
imparting the reaction liquid contained in the ink set to the non-absorptive recording medium or the low-absorptive recording medium;
imparting the first ink contained in the ink set to the area to which the reaction liquid is imparted; and
imparting the second ink contained in the ink set to the area to which the first ink is imparted.

13. A recording method using the ink set according to claim 3, the method comprising:
imparting the reaction liquid contained in the ink set to the non-absorptive recording medium or the low-absorptive recording medium;
imparting the first ink contained in the ink set to the area to which the reaction liquid is imparted; and
imparting the second ink contained in the ink set to the area to which the first ink is imparted.

14. A recording method using the ink set according to claim 4, the method comprising:
imparting the reaction liquid contained in the ink set to the non-absorptive recording medium or the low-absorptive recording medium;
imparting the first ink contained in the ink set to the area to which the reaction liquid is imparted; and
imparting the second ink contained in the ink set to the area to which the first ink is imparted.

15. A recording method using the ink set according to claim 5, the method comprising:
imparting the reaction liquid contained in the ink set to the non-absorptive recording medium or the low-absorptive recording medium;
imparting the first ink contained in the ink set to the area to which the reaction liquid is imparted; and
imparting the second ink contained in the ink set to the area to which the first ink is imparted.

16. A recording method using the ink set according to claim 6, the method comprising:
imparting the reaction liquid contained in the ink set to the non-absorptive recording medium or the low-absorptive recording medium;
imparting the first ink contained in the ink set to the area to which the reaction liquid is imparted; and
imparting the second ink contained in the ink set to the area to which the first ink is imparted.

17. The recording method according to claim 11, wherein after the imparting of the first ink and before the imparting of the second ink, a volatilization amount of a volatile component contained in the reaction liquid and the first ink on the non-absorptive recording medium or the low-absorptive recording medium is less than or equal to 95 mass % with respect to 100 total mass % of a volatile component of the reaction liquid and the first ink before the imparting.

18. The recording method according to claim 11, wherein a ratio of the number of moles (unit: mol) of a polyvalent metal salt contained in the reaction liquid to the total mass (unit: g) of a color material contained in the first ink and the second ink, per unit area of the non-absorptive recording medium or the low-absorptive recording medium is 1000:1 to 31000:1.

19. The recording method according to claim 11, wherein a ratio of the number of moles (unit: mol) of an organic acid contained in the reaction liquid to the total mass (unit: g) of the color material contained in the first ink and the second ink, per unit area of the non-absorptive recording medium or the low-absorptive recording medium is 800:1 to 5500:1.

20. The recording method according to claim 11, wherein a ratio of the mass (unit: g) of at least one selected from the group consisting of a component which becomes a receiving layer of the first ink and the second ink, and a cationic resin, which are contained in the reaction liquid per unit area of the non-absorptive recording medium or low-absorptive recording medium, to the mass (unit: g) of the color material contained in the first ink is 7:1 to 70:1.

21. The ink set according to claim 1, wherein the resin emulsion is a thermoplastic resin emulsion.

22. The ink set according to claim 1, wherein the cationic resin emulsion is a polyolefin-based resin emulsion or a polyester-based resin emulsion.

* * * * *